US009998891B2

(12) United States Patent
Chiba et al.

(10) Patent No.: US 9,998,891 B2
(45) Date of Patent: Jun. 12, 2018

(54) NETWORK SYSTEM, SERVER, TERMINAL, AND INFORMATION PROCESSING METHOD

(71) Applicant: SHARP KABUSHIKI KAISHA, Osaka-shi, Osaka (JP)

(72) Inventors: Masahiro Chiba, Osaka (JP); Toru Ueda, Osaka (JP); Kazuyuki Nako, Osaka (JP); Masaki Hashiura, Osaka (JP); Kazuhiro Miki, Osaka (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 371 days.

(21) Appl. No.: 14/712,258

(22) Filed: May 14, 2015

(65) Prior Publication Data

US 2015/0334188 A1 Nov. 19, 2015

(30) Foreign Application Priority Data

May 14, 2014 (JP) .................................. 2014-100401

(51) Int. Cl.
*G06F 15/16* (2006.01)
*H04L 29/08* (2006.01)
*H04W 4/08* (2009.01)
*H04W 4/20* (2018.01)

(52) U.S. Cl.
CPC ............. *H04W 4/21* (2018.02); *H04L 67/125* (2013.01); *H04W 4/08* (2013.01); *H04W 4/206* (2013.01)

(58) Field of Classification Search
CPC ...... H04L 67/125; H04W 4/08; H04W 4/206; H04W 4/21

USPC ................................................... 709/203, 206
See application file for complete search history.

(56) References Cited

U.S. PATENT DOCUMENTS

| | | | |
|---|---|---|---|
| 2010/0015968 A1* | 1/2010 | Moriwaki | H04M 3/42263 455/422.1 |
| 2013/0203409 A1* | 8/2013 | Yang | H04W 8/04 455/432.3 |
| 2014/0219161 A1* | 8/2014 | Kowalewski | H04W 88/04 370/315 |
| 2014/0250183 A1* | 9/2014 | Unagami | H04M 3/5166 709/204 |
| 2014/0269614 A1* | 9/2014 | Maguire | H04W 36/18 370/331 |
| 2014/0355489 A1* | 12/2014 | Besombe | H04M 3/561 370/261 |

(Continued)

FOREIGN PATENT DOCUMENTS

| | | |
|---|---|---|
| JP | 2013-250684 | 12/2013 |
| JP | 2014-021851 | 2/2014 |
| WO | WO 2014/024428 A1 | 2/2014 |

OTHER PUBLICATIONS

Japanese Office Action dated Aug. 9, 2016 in JP application 2014-100401.

*Primary Examiner* — Frantz Jean
(74) *Attorney, Agent, or Firm* — ScienBiziP, P.C.

(57) ABSTRACT

A network system includes a plurality of terminals including at least a first terminal and a second terminal, one or more devices including at least a first device, and a server adapted to refer to group information. The server refers to the group information and determines whether to accept a request for the first device from the second terminal, when in a state of accepting a request for the first device from the first terminal.

6 Claims, 36 Drawing Sheets

(56) References Cited

U.S. PATENT DOCUMENTS

2015/0127733 A1* 5/2015 Ding ...................... H04W 4/08
                                                    709/204
2015/0168930 A1   6/2015 Nakano et al.
2015/0180880 A1   6/2015 Nakano et al.

* cited by examiner

| USER ID | GROUP ID |
|---------|----------|
| 00001 | AAA |
| 00005 | BBB |
| 00101 | AAA |
| 00234 | BBB |
| 00557 | CCC |
| 00001 | DDD |
| ⋮ | ⋮ |

| DEVICE ID | GROUP ID | MAC ADDRESS | DEVICE INFORMATION |
|---|---|---|---|
| 10001 | AAA | XXX | ······· |
| 10023 | BBB | YYY | ······· |
| 10456 | CCC | ZZZ | ······· |
| 12345 | BBB | YYY | ······· |
| 18543 | AAA | XXX | ······· |
| 10001 | DDD | XXX | ······· |
| ⋮ | ⋮ | ⋮ | ⋮ |

| TERMINAL ID | GROUP ID |
|---|---|
| 50001 | AAA |
| 50005 | BBB |
| 50101 | AAA |
| 50234 | BBB |
| 50557 | CCC |
| ⋮ | ⋮ |

| DEVICE ID | PAIRING USER ID | MAC ADDRESS | DEVICE INFORMATION |
|---|---|---|---|
| 10001 | 00001 | XXX | ....... |
| 10023 | 00005 | YYY | ....... |
| 10456 | 00557 | ZZZ | ....... |
| 12345 | 00005 | YYY | ....... |
| 16543 | 00001 | XXX | ....... |
| ⋮ | ⋮ | ⋮ | ⋮ |

| DEVICE ID | PAIRING TERMINAL ID | MAC ADDRESS | DEVICE INFORMATION |
|---|---|---|---|
| 10001 | 50001 | XXX | ........ |
| 10023 | 50005 | YYY | ........ |
| 10456 | 50557 | ZZZ | ........ |
| 12345 | 50005 | YYY | ........ |
| 16543 | 50001 | XXX | ........ |
| ⋮ | ⋮ | ⋮ | ⋮ |

101E

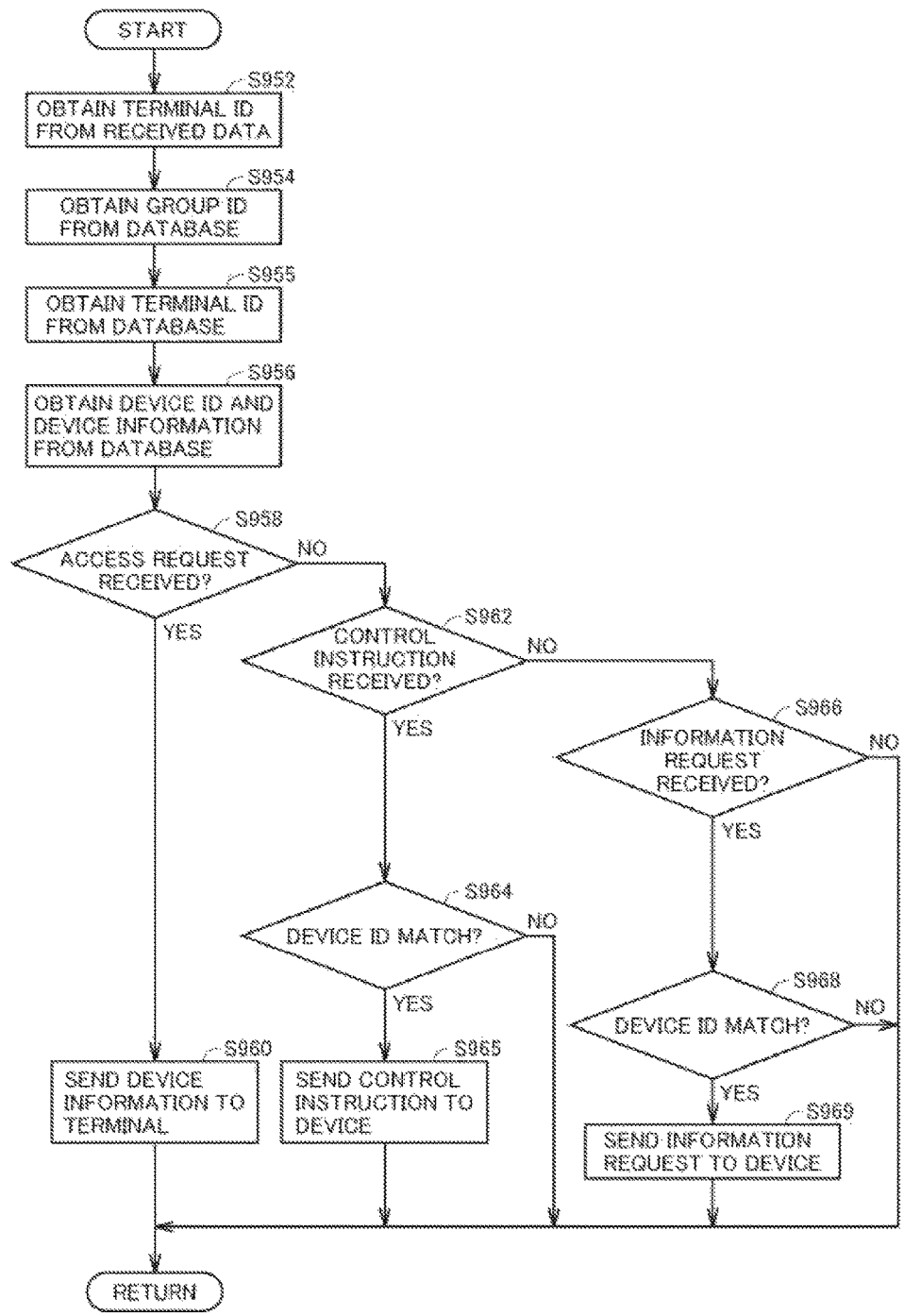

NETWORK SYSTEM, SERVER, TERMINAL, AND INFORMATION PROCESSING METHOD

This application claims priority to Japan Patent Application No. 2014-100401 filed 14 May 2014, the entire contents of which is hereby incorporated by reference.

BACKGROUND OF THE INVENTION

Field of the Invention

The present invention relates to a network system, a server, a terminal, and an information processing method that allow a user to control home devices such as an air conditioner and a television, or obtain information of such devices from outside by using terminals such as a smartphone and a tablet.

Description of the Related Art

A network system for controlling devices or obtaining device information from a terminal is known. For example, JP-A-2013-250684 discloses an autonomous electronic device, and a control system for the autonomous electronic device. The autonomous vacuum cleaner described in this publication includes a communication unit that performs wireless communications with other devices connected in a local communication network. The autonomous vacuum cleaner is controlled to perform the operations associated with the registered communication terminal devices, first to fifth terminals, in response to the initiation of the connection of these terminals to the local communication network.

JP-A-2014-21851 discloses a monitoring device, an information managing device, a monitoring system, a monitoring device control method, an information managing method, a program. This publication describes a television processor that executes the process including: detecting the turning on of a television; accepting entry of a setting (outing setting) indicative of the outing of an inhabitant; sending a signal (absence signal) indicative of the outing setting to a server connected to the television; detecting the turning off of the television; and sending a presence signal indicative of residence upon the television being turned on and when the duration from the OFF time to the ON time is longer than a predetermined time period.

Under these circumstances, there is a present need for a network system that can more easily or safely enable a new terminal to control devices or obtain device information.

SUMMARY OF INVENTION

It is accordingly an object of the present invention to provide a network system that can more easily or safely enable a new terminal to control devices or obtain device information than in related art. The invention is also intended to provide a communication method, a server, a terminal, and a program.

According to some aspects of the invention, there is provided a network system. The network system includes: a plurality of terminals including at least a first terminal and a second terminal; one or more devices including at least a first device; and a server adapted to refer to group information. The server refers to the group information and determines whether to accept a request for the first device from the second terminal, when in a state of accepting a request for the first device from the first terminal.

Preferably, the group information is information concerning the relationship between identification information of users of the plurality of terminals, and identification information of the one or more devices, and the server accepts the request from the second terminal when a user of the second terminal belongs to a group to which the first device belongs, and rejects the request from the second terminal when the user of the second terminal does not belong to the group to which the first device belongs.

Preferably, the group information is information concerning the relationship between identification information of the plurality of terminals, and identification information of the one or more devices, and the server accepts the request from the second terminal when the second terminal belongs to a group to which the first device belongs, and rejects the request from the second terminal when the second terminal does not belong to the group to which the first device belongs.

Preferably, the group information is information concerning the relationship of identification information of users of the plurality of terminals, and the server accepts the request from the second terminal when a user of the second terminal belongs to a group to which a user of the first terminal belongs, and rejects the request from the second terminal when the user of the second terminal does not belong to the group to which the user of the first terminal belongs.

Preferably, the group information is information concerning the relationship of identification information of the plurality of terminals, and the server accepts the request from the second terminal when the second terminal belongs to a group to which the first terminal belongs, and rejects the request from the second terminal when the second terminal does not belong to the group to which the first terminal belongs.

Preferably, the server or a different server sends the second terminal information for inviting the second terminal to a group to which a user of the first terminal belongs, the information being sent according to an instruction from the first terminal.

Preferably, a user of the first terminal belonging to a first group to which a user of the second terminal belongs is allowed to belong to a second group to which a user of a third terminal belongs.

According to another aspect of the invention, there is provided an information processing method for a network system that includes: a plurality of terminals including at least a first terminal and a second terminal; one or more devices including at least a first device; and a server. The method includes the server referring to group information and determining whether to accept a request for the first device from the second terminal, when in a state of accepting a request for the first device from the first terminal.

According to another aspect of the invention, there is provided a server that includes: a communication interface for communicating with a plurality of terminals including at least a first terminal and a second terminal, and one or more devices including at least a first device; and a processor. The processor refers to group information and determines whether to accept a request for the first device from the second terminal, when the server is in a state of accepting a request for the first device from the first terminal.

According to another aspect of the invention, there is provided an information processing method for a server that includes: a communication interface for communicating with a plurality of terminals including at least a first terminal and a second terminal, and one or more devices including at least a first device; and a processor. The method includes the processor referring to group information and determining whether to accept a request for the first device from the second terminal, when the server is in a state of accepting a request for the first device from the first terminal via the communication interface.

According to another aspect of the invention, there is provided a terminal that includes: a communication interface for communicating with other devices; and a processor. The processor via the communication interface receives an invitation for joining a group, sends information for joining the group in response to the invitation, and sends a request for a device belonging to the group.

According to another aspect of the invention, there is provided an information processing method for a terminal that includes: a communication interface for communicating with other devices; and a processor. The method includes: the processor receiving via the communication interface an invitation for joining a group; the processor sending via the communication interface information for joining the group; and the processor sending via the communication interface a request for a device belonging to the group.

According to another aspect of the invention, there is provided a network system. The network system includes: a plurality of terminals including at least a first terminal and a second terminal; one or more devices including at least a first device; and a server adapted to communicate with the plurality of terminals and the one or more devices. The second terminal receives an invitation for the first device from the first terminal and sends the server a request for the first device in response to the invitation, when the server is in a state of accepting a request for the first device from the first terminal.

According to another aspect of the invention, there is provided an information processing method for a network system that includes: a plurality of terminals including at least a first terminal and a second terminal; one or more devices including at least a first device; and a server. The method includes: when the server is in a state of accepting a request for the first device from the first terminal, the first terminal sending the second terminal an invitation for the first device; and the second terminal sending the server a request for the first device in response to the invitation.

In this way, the present invention can provide a network system that can more easily or safely enable a new terminal to control devices or obtain device information than in related art. The invention also can provide a communication method, a server, a terminal, and a program.

Additional features and advantages of the present disclosure will be set forth in the following detailed description. Alternatively, additional features and advantages will be readily apparent to those skilled in the art from the content of the detailed description, or will be recognized by practicing the invention described herein, including the detailed description, the claims, and the appended drawings. It is to be understood that the foregoing general description concerning the related art and the following detailed description are provided solely for illustrative purposes, and are intended to provide an overview or framework for understanding the nature and character of the invention as claimed.

BRIEF DESCRIPTION OF THE DRAWINGS

FIG. 35 is a schematic diagram representing the data structure of a terminal database 101C according to Seventh Embodiment.

FIG. 37 is a schematic diagram representing the data structure of a pairing user database 101D according to Eighth Embodiment.

FIG. 39 is a schematic diagram representing the data structure of a pairing terminal database 101E according to Ninth Embodiment.

FIG. 40 is a flowchart representing the information process by a server 100 according to Ninth Embodiment.

DESCRIPTION OF THE PREFERRED EMBODIMENTS

Figure 1A:
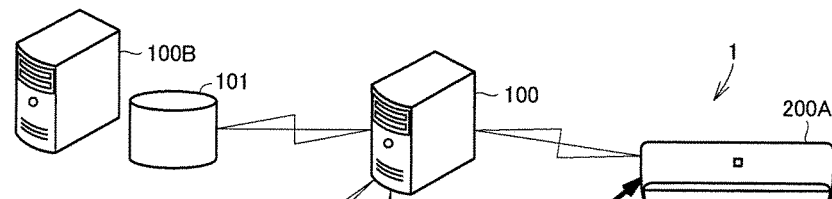
FIGS. 1(*a*) to 1(*c*) are schematic diagrams representing the overall configuration and a brief overview of the operation of a network system 1 according to an embodiment of the present invention.

Embodiments of the present invention are described below with reference to the accompanying drawings. In the following descriptions, like elements are given like reference numerals. Such like elements will be referred to by the same names, and have the same functions. Accordingly, detailed descriptions of such elements will not be repeated.

First Embodiment

<Overall Configuration of Network System>

Figure 1B:
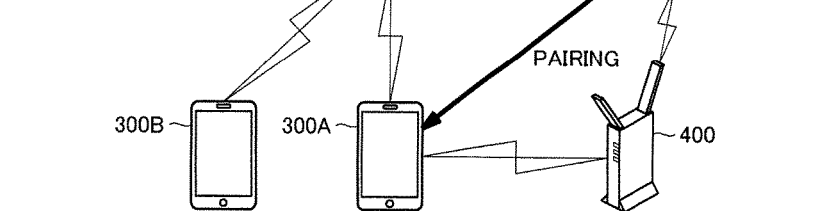
Figure 1C:
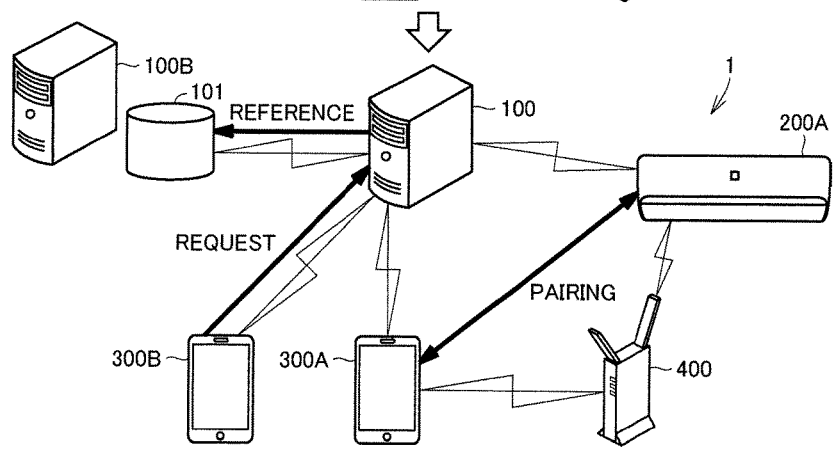

The overall configuration of the network system 1 according to the present embodiment is described below with reference to FIGS. 1(a) to 1(c). FIGS. 1(a) to 1(c) are schematic diagrams representing the overall configuration and a brief overview of the operation of the network system 1 according to the present embodiment.

Referring to FIG. 1(a), the overall configuration of the network system 1 is briefly described below. The network system 1 mainly includes a device control service server 100, an air conditioner 200A (device), and smartphones 300A and 300B (terminals). In the present embodiment, the network system 1 also includes a database 101 and a group server 100B. The device control service server 100 may store the database 101. The device control service server 100 may serve as the group server 100B.

The server 100 is connected to the smartphones 300A and 300B, and devices such as the air conditioner 200A via a network such as the Internet. For example, the server 100 accepts instructions from the smartphones 300A and 300B, and controls devices such as the air conditioner 200A via the Internet. The server 100 also receives data from devices such as the air conditioner 200A via the Internet, and forwards the data to the smartphones 300A and 300B.

The first smartphone 300A is owned by a first user. The second smartphone 300B is owned by a second user. The first and second users, via their first and second smartphones 300A and 300B, control devices such as the air conditioner 200A, and obtain information concerning the air conditioner 200A and other devices. The terminals used by the first and second users are not limited to the smartphones 300A and 300B, and may be terminals, for example, such as tablets, personal computers, notebook computers, gaming machines, and electronic books that can communicate with the server 100. In the following, these will be collectively referred to also as terminals 300.

Devices such as the air conditioner 200A send the server 100 data such as control instructions sent from a remote controller, and measurement data obtained by a sensor. The data are sent via, for example, a controller, a router, and the Internet. Devices such as the air conditioner 200A perform various operations based on control instructions from the server 100 and the smartphone 300A. The devices are not limited to the air conditioner 200A, and may be, for example, home appliances such as a refrigerator, a washing machine, an autonomous vacuum cleaner, AV (audio visual) devices such as a television, a hard disk recorder, and a music player; or household equipment such as a photovoltaic generator, an intercom, and a water heater. In the following, these will be collectively referred to also as devices 200.

The database 101 store group information concerning users, the terminals 300, and the devices 200. For example, the database 101 stores a group of information including users belonging to a family group, the terminals 300 of the users belonging to the family group, and the devices 200 of the users belonging to the family group. The database 101 can be referred to by the device control service server 100 and the group server 100B.

The group server 100B registers the group relationships between users and devices 200 in the database 101, and uses the group relationships between users and devices 200 by referring to the database 101. The group server 100B may search and read information from the database 101 at the request of the server 100, and feed the information to the server 100.

<Brief Overview of Network System Operation>

The following describes the overall operation of the network system 1 according to the present embodiment with reference to FIGS. 1(a) to 1(c).

Referring to FIG. 1 (c), the first user is able to control the air conditioner 200A or obtain information from the air conditioner 200A via the first smartphone 300A. Specifically, the first user activates a device control application in the first smartphone 300A, and logs in a service provided by the server 100 to control the air conditioner 200A, or obtain information from the air conditioner 200A. In the following, the terminal 300 and the device 200 are said to have been paired when the device 200 becomes controllable by any of the terminals 300 from an uncontrollable state. Specifically, the term "pairing" will be used to describe the state in which the device 200 becomes ready to accept a control instruction (a type of first request) from the terminal 300.

In this state, the second user with the second smartphone 300B may wish to control the air conditioner 200A or obtain information from the air conditioner 200A. Referring to FIG. 1 (*b*), the second user in the present embodiment activates a home appliances control application in the second smartphone 300B, and logs in a service provided by the server 100 to have access to the air conditioner 200A. In response to the request from the second smartphone 300B, the server 100 refers to the database 101, and determines whether the user of the second smartphone 300B belongs to the group to which the air conditioner 200A belongs.

The server 100 rejects the request from the second smartphone 300B when the user of the second smartphone 300B does not belong to the group to which the air conditioner 200A belongs. For example, the server 100 does not give the second smartphone 300B the identification information of the air conditioner 200A. Specifically, the server 100 does not permit the second smartphone 300B to specify the air conditioner 200A.

Alternatively, the server 100 gives the second smartphone 300B the identification information of the air conditioner 200A, but does not permit the second smartphone 300B to obtain operation information or state information from the air conditioner 200A. Alternatively, the server 100 gives the second smartphone 300B the operation information or the state information of the air conditioner 200A, but does not allow a control instruction for the air conditioner 200A to be sent to the air conditioner 200A.

On the other hand, referring to FIG. 1(*c*), the server 100 allows the request from the second smartphone 300B when the user of the second smartphone 300B belongs to the group to which the air conditioner 200A belongs. The second user can then obtain the identification information of the air conditioner 200A, and have access to the air conditioner 200A through the device control application of the second smartphone 300B. Alternatively, the second user can obtain operation information or state information from the air conditioner 200A through the device control application of the second smartphone 300B. Alternatively, the second user can control the air conditioner 200A through the device control application of the second smartphone 300B (the second user can send the same request as would be possible by pairing).

In this manner, in the network system 1 according to the present embodiment, the server 100, in response to the second user requesting for control of the device 200 or for information of the device 200 via the second terminal 300, determines whether to allow the request on the basis of whether the second user and the device 200 belong to the same group.

The network system 1 according to the present embodiment can thus provide an easier and safer way for the terminal to control the device or obtain information from the device. More specifically, the pairing process needed for the pairing of the device with a first user is not required for the rest of the users, and the required process for the users is easier than in the systems of related art. The network system also has improved security because a user who is not a member of a group is prohibited from accessing or controlling the device, or viewing information of the device.

The following specifically describes how such functions are realized in the network system 1.

<Hardware Configuration of Server 100>

Figures 2, 3:
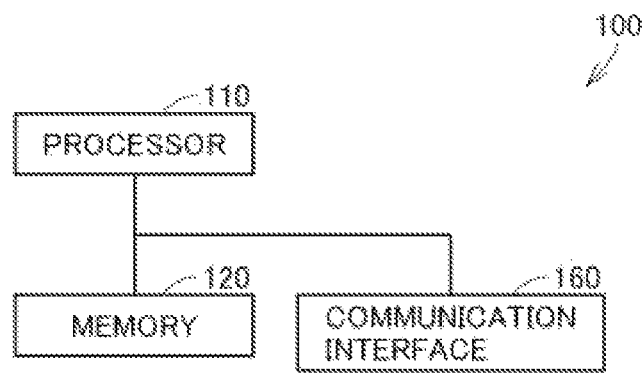
FIG. 2 is a block diagram representing the hardware configuration of a server 100 according to the embodiment.
FIG. 3 is a schematic diagram representing the data structure of a user database 101A according to the embodiment.

The following describes an aspect of the hardware configuration of the server 100 in the network system 1. FIG. 2 is a block diagram representing the hardware configuration of the server 100 according to the present embodiment.

Referring to FIG. 2, the main constituting elements of the server 100 include a processor 110, a memory 120, and a communication interface 160.

The processor 110 controls each part of the server 100 by running programs stored in the memory 120 or in external storage media. Specifically, the processor 110 executes the programs stored in the memory 120 to perform various processes, as will be described later.

The memory 120 is realized by various types of memory, including, for example, RAM (Random Access Memory), ROM (Read-Only Memory), and flash memory. The memory 120 may also be realized by, for example, storage media used with an interface, including, for example, USB® (Universal Serial Bus) memory, CD (Compact Disc), DVD (Digital Versatile Disk), memory card, hard disk, IC (Integrated Circuit) card, optical memory card, mask ROM, EPROM (Erasable Programmable Read Only Memory), and EEPROM (Electronically Erasable Programmable Read-Only Memory).

The memory 120 stores programs run by the processor 110, data generated after the execution of a program by the processor 110, input data, and data received from the device 200 and the terminal 300. The memory 120 may store the database 101 shown in FIGS. 1 (*a*) to 1(*c*). In the present embodiment, the database 101 includes a user database representing the relationships between users and groups, and a device database representing the relationships between devices and groups.

FIG. 3 is a schematic diagram representing the data structure of a user database 101A according to the present embodiment. Referring to FIG. 3, the user database 101A stores the associations between user IDs and group IDs.

Figures 4, 5:
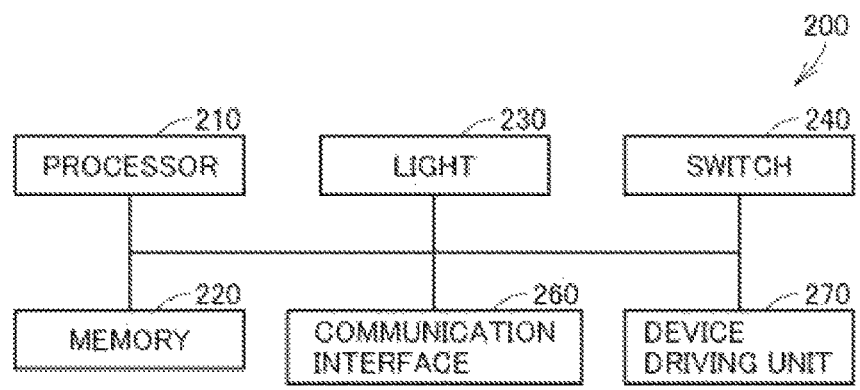
FIG. 4 is a schematic diagram representing the data structure of a device database 101B according to the embodiment.
FIG. 5 is a block diagram representing the hardware configuration of a device 200 according to the embodiment.

FIG. 4 is a schematic diagram representing the data structure of a device database 101B according to the present embodiment. Referring to FIG. 4, the device database 101B stores the associations between device IDs, group IDs, MAC addresses, and other device information.

The database 101 may be stored in the group server 100B, or may be stored in some other device as long as it can be referred to by the server 100 and the group server 100B.

Referring back to FIG. 2, the communication interface 160 sends data from the processor 110 to the terminal 300 and the device 200 via, for example, the Internet, a carrier network, a wireless adapter, or a router. The communication interface 160 receives data from the terminal 300 and the device 200 via, for example, the Internet, a carrier network, a wireless adapter, or a router, and passes the data to the processor 110.

The hardware configuration of the group server 100B is the same as that of the server 100, and will not be described.

<Hardware Configuration of Device 200>

The following describes an aspect of the hardware configuration of the device 200. FIG. 5 is a block diagram representing the hardware configuration of the device 200 according to the present embodiment.

Referring to FIG. 5, the main constituting elements of the device 200 include a processor 210, a memory 220, various lights 230, various switched 240, a communication interface 260, and a device driving unit 270.

The processor 210 controls each part of the device 200 by running programs stored in the memory 220 or in external storage media. Specifically, the processor 210 executes the programs stored in the memory 220 to perform various processes, as will be described later.

The memory 220 is realized by various types of memory, including, for example, RAM, ROM, and flash memory. The memory 220 stores programs run by the processor 210, data generated after the execution of a program by the processor 210, input data, and data received from the server 100.

The lights 230 become on or off, or blink according to signals from the processor 210 to externally indicate the current state of the device 200.

The switches 240 accept entry of user instructions, and input the instructions to the processor 210.

The communication interface 260 sends the server 100 data from the processor 210, for example, such as a state of the device, and a user instruction entered in the device via a remote controller. The data are sent via, for example, the Internet, a wireless adapter, or a router 400 (see FIGS. 1(*a*) to 1(*c*)). The communication interface 260 receives data from the server 100, for example, such as a control instruction and a viewing instruction from the terminal 300, and passes the data to the processor 210. The data are received via, for example, the Internet, a wireless adapter, or the router 400.

The device driving unit 270 controls different parts of the device, for example, such as motors, actuators, sensors, and a speaker as instructed by the control instruction from the processor 210, and serves a major role in the device 200.

<Hardware Configuration of Terminal 300>

Figure 6:
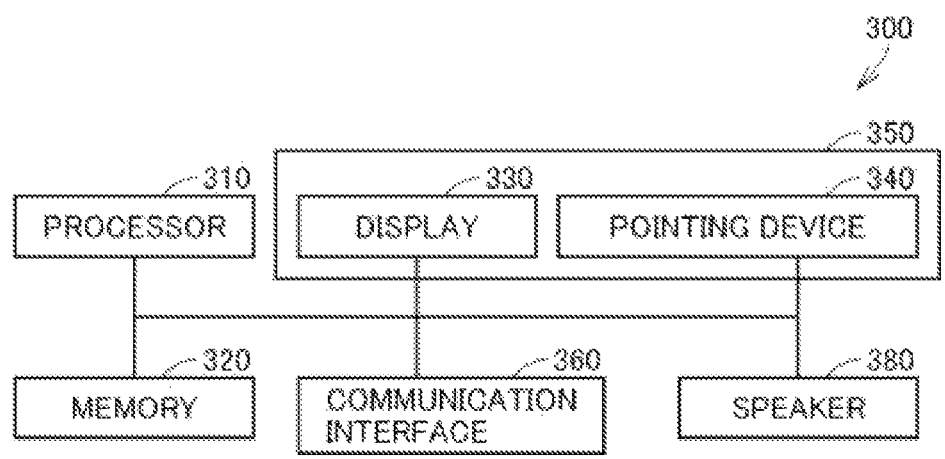
FIG. 6 is a block diagram representing the hardware configuration of a terminal 300 according to the embodiment.

The following describes an aspect of the hardware configuration of the terminal 300. FIG. 6 is a block diagram representing the hardware configuration of the terminal 300 according to the present embodiment.

Referring to FIG. 6, the main constituting elements of the terminal 300 include a processor 310, a memory 320, a touch panel 350 (including a display 330 and a pointing device 340), a communication interface 360, and a speaker 380.

The processor 310 controls each part of the terminal 300 by running programs stored in the memory 320 or in external storage media. Specifically, the processor 310 executes the programs stored in the memory 320 to perform various processes, as will be described later.

The memory 320 is realized by various types of memory, including, for example, RAM, ROM, and flash memory. The memory 320 may also be realized by, for example, storage media used with an interface, including, for example, memory cards such as SD card and micro SD card, USB® memory, CD, DVD, hard disk, IC card, optical memory card, mask ROM, EPROM, and EEPROM.

The memory 320 stores programs run by the processor 310, data generated after the execution of a program by the processor 310, input data through the pointing device 340, and data received from the server 100 and the group server 100B. Specifically, in the present embodiment, the memory 320 stores device control applications. The processor 310 performs various processes according to the device control applications stored in the memory 320, as will be described later.

The display 330 outputs characters and images based on signals from the processor 310. The pointing device 340 receives a user instruction, and inputs the instruction to the processor 310. In the present embodiment, the touch panel 350 in the terminal 300 is a combination of a display 330 and a pointing device 340.

The communication interface 360 is realized by an antenna and a connector. The communication interface 360 uses wired communications or wireless communications to exchange data with other devices. The processor 310 sends data such as text data and image data to the server 100 and other devices via the communication interface 360. For example, the processor 310 sends the server 100 various requests for the device 200. The processor 310 receives data such as programs, control instructions, image data, and text data from the server 100 and other devices via the communication interface 360.

The speaker 380 outputs various sounds such as voice, music, and video sounds by using sound signals from the processor 310.

<Information Process in Network System 1>

Figure 7:
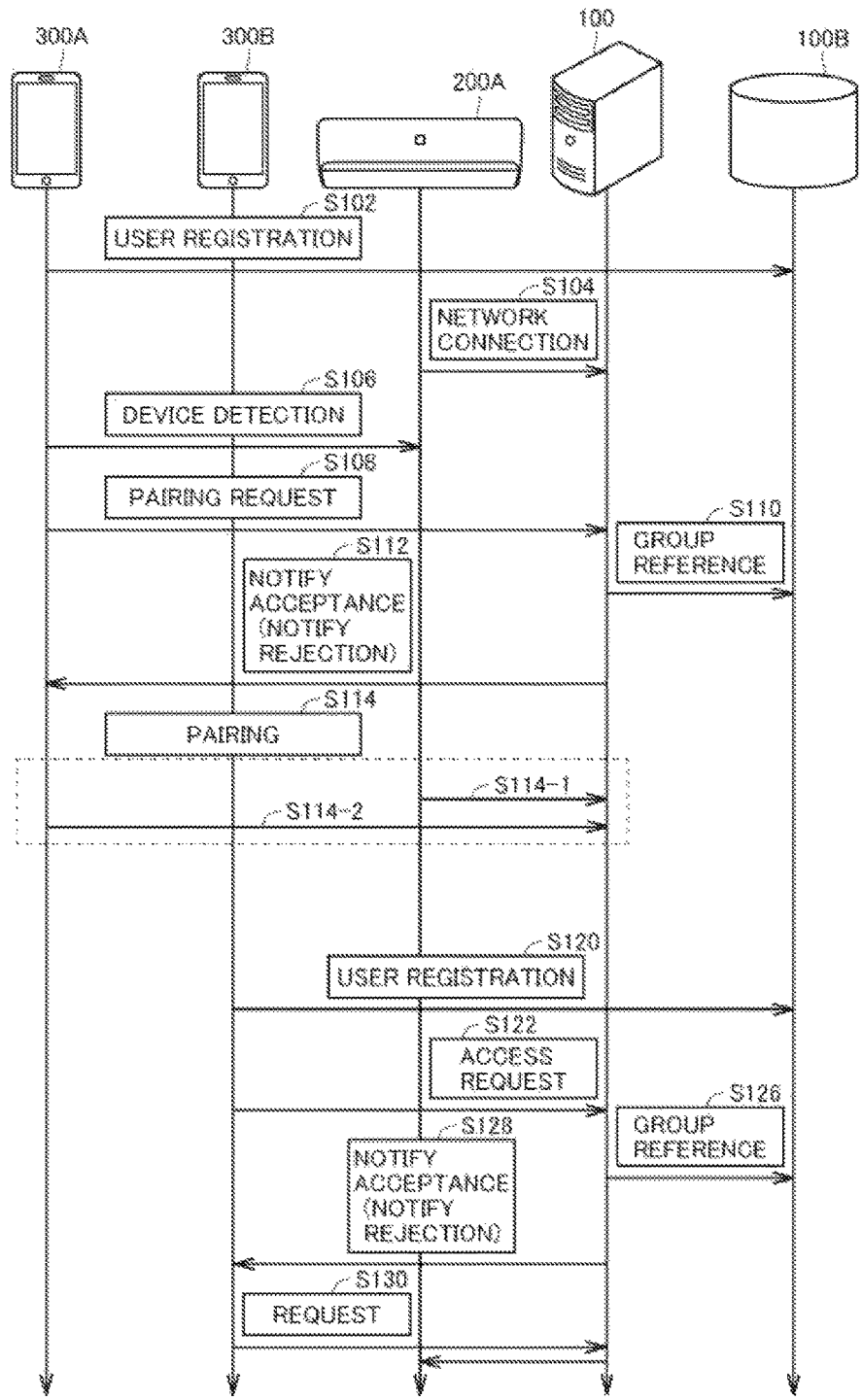
FIG. 7 is a sequence diagram representing the information process in the network system 1 according to the embodiment.

The following describes the information process by the network system 1 according to the present embodiment with reference to FIG. 7. FIG. 7 is a sequence diagram representing the information process by the network system 1 according to the present embodiment.

First, a first user via the first terminal 300 makes user registration in the group server 100B having access to the database 101 (step S102). For example, the first user resisters a user ID and a password in the group server 100B, or obtains a user ID and a password from the group server 100B. In the present embodiment, the group server 100B operates the service for managing groups. However, this function may be served by the device control service server 100 instead.

Thereafter, the device 200 is installed in the home of the first user. The device 200 starts communicating with the server 100 via, for example, wireless LAN or the Internet (step S104). Here, the server 100 grants identification information for communications to the device 200, the identification information being associated with the MAC address. The server 100 stores the association of the identification information with the MAC address.

The first user then activates a device control application in the terminal 300 to start a pairing process with the device 200.

Figure 8:
FIG. 8 is a schematic diagram representing a first screen example of a touch panel 350 in the terminal 300 according to the embodiment.
Figure 9:
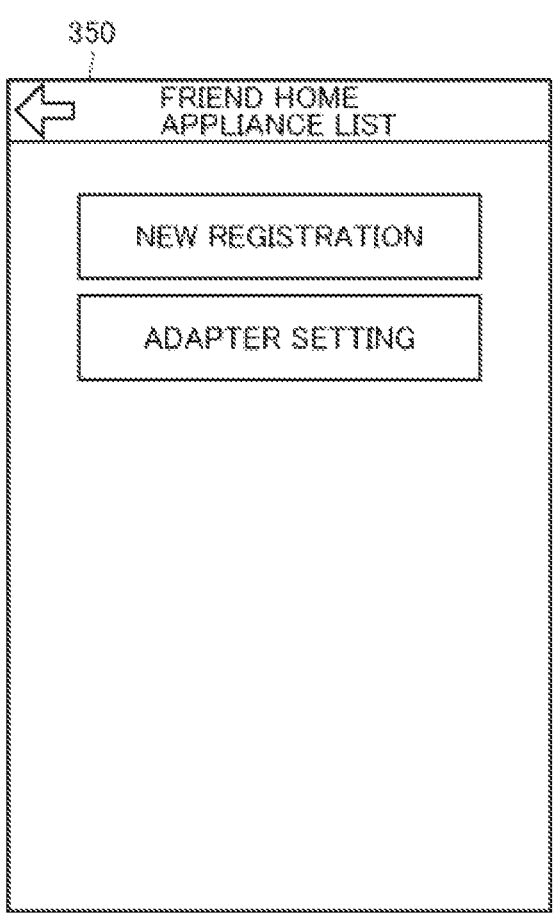
FIG. 9 is a schematic diagram representing a second screen example of the touch panel 350 in the terminal 300 according to the embodiment.

Specifically, as shown in FIG. 8, the processor 310 of the terminal 300 accepts entry of a user ID and a password from the first user via the device control application browser. The processor 310 sends the user ID and the password to the server 100 via the communication interface 360. The processor 110 of the server 100 accesses the database 101 or the group server 100B via the communication interface 160, and authenticates the user ID and the password from the terminal 300. When the authentication of the user ID and the password by the server 100 is successful, the processor 310 of the terminal 300 accepts an instruction for starting a communication setting for a new device to be controlled, via the touch panel 350, as shown in FIG. 9.

Figure 10:
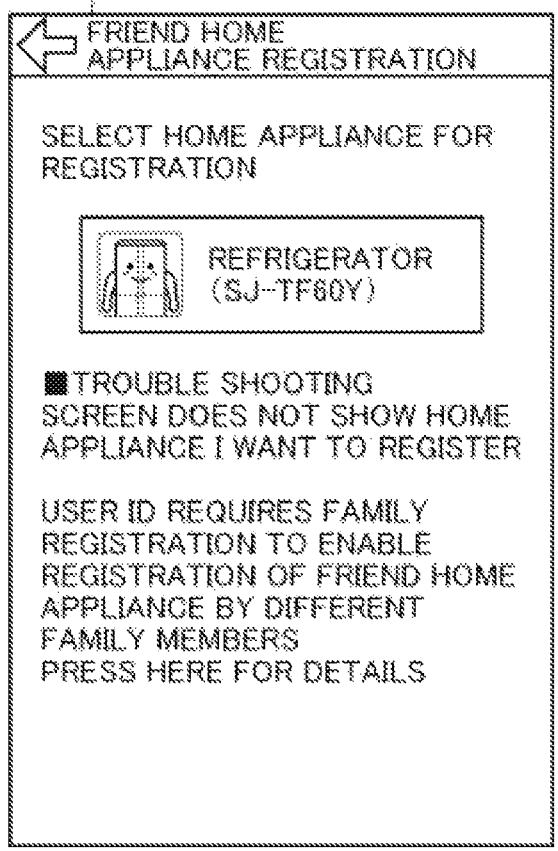
FIG. 10 is a schematic diagram representing a third screen example of the touch panel 350 in the terminal 300 according to the embodiment.
Figure 11:
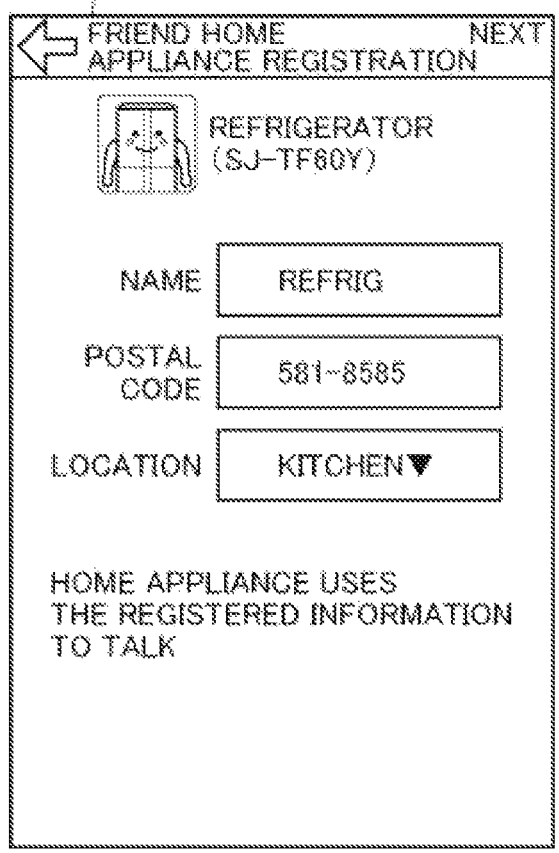
FIG. 11 is a schematic diagram representing a fourth screen example of the touch panel 350 in the terminal 300 according to the embodiment.

The processor 310 of the terminal 300 then searches for a devices 200 that is available for wireless communications such as by WiFi® and Bluetooth®, using the communication interface 360 (step S106). By using the information from the device 200 that is available for communications, the processor 310 of the terminal 300 displays selectable information, such as the type or the name of the device 200, on the touch panel 350, as shown in FIG. 10. The processor 310 of the terminal 300 then accepts entry of information concerning the device 200 via the touch panel 350, as shown in FIG. 11.

The processor 310 of the terminal 300 makes a pairing request for the device 200 by sending the information from the device 200 and the information from the user to the server 100 via the communication interface 360 (step S108). For example, the processor 310 of the terminal 300 receives the identification information from the device 200 via the communication interface 360 through wireless communications. The processor 310 then sends the identification information and the user ID to the server 100 via the communication interface 360.

In the present embodiment, the processor 110 of the server 100 refers to the database 101, and determines whether the identification information or the MAC address of the device 200 is registered in the group to which the user of the terminal 300 belongs (step S110).

If it is determined upon referring to the database 101 that the device 200 has not been registered in any of the groups of the user of the terminal 300, the processor 110 of the server 100 allows the pairing of the terminal 300 with the device 200 (step S112). Here, the processor 110 of the server 100 stores the information concerning the device 200 in the device database 101B by associating the information with the group ID. Specifically, the processor 110 automatically registers the device 200 in the same group to which the user of the terminal 300 belongs when the device 200 is paired with the terminal 300 for the first time.

Figure 12:
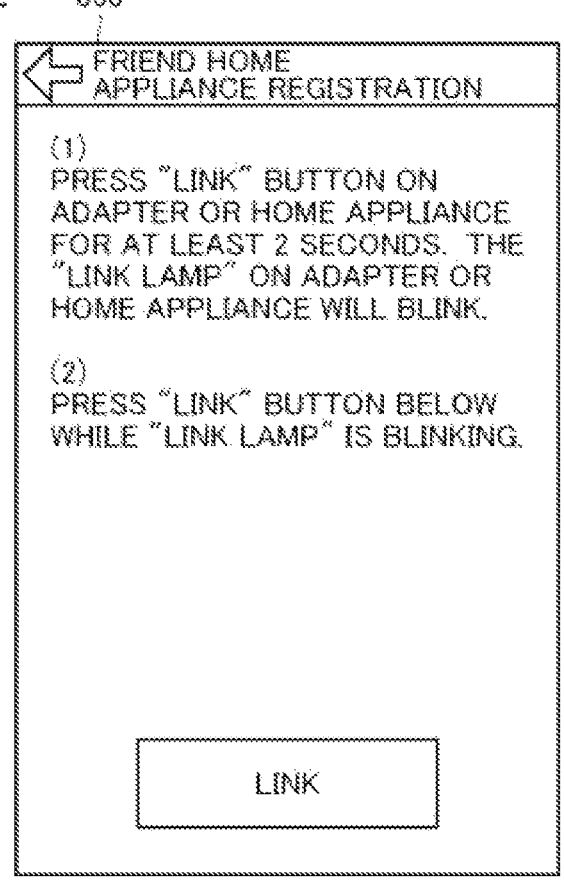
FIG. 12 is a schematic diagram representing a fifth screen example of the touch panel 350 in the terminal 300 according to the embodiment.

This enables pairing of the processor 310 of the terminal 300 with the device 200 (step S114). Specifically, as shown in FIG. 12, the processor 310 of the terminal 300 displays the pairing procedures for the device 200 and the terminal 300 in the touch panel 350. At the press of a pairing button by the user, the device 200 sends the identification information to the server 100 (step S114-1).

At the press of a link button in the terminal 300, the processor 310 of the terminal 300 sends the identification information to the server 100 (step S114-2). The server 100 checks that the pairing signal has been sent from the device 200 that is associated with the received identification information from the terminal 300, and notifies the terminal 300 of the completion of the pairing. Once the pairing is established, the user can remote control the device 200 via the terminal 300.

Figure 13:
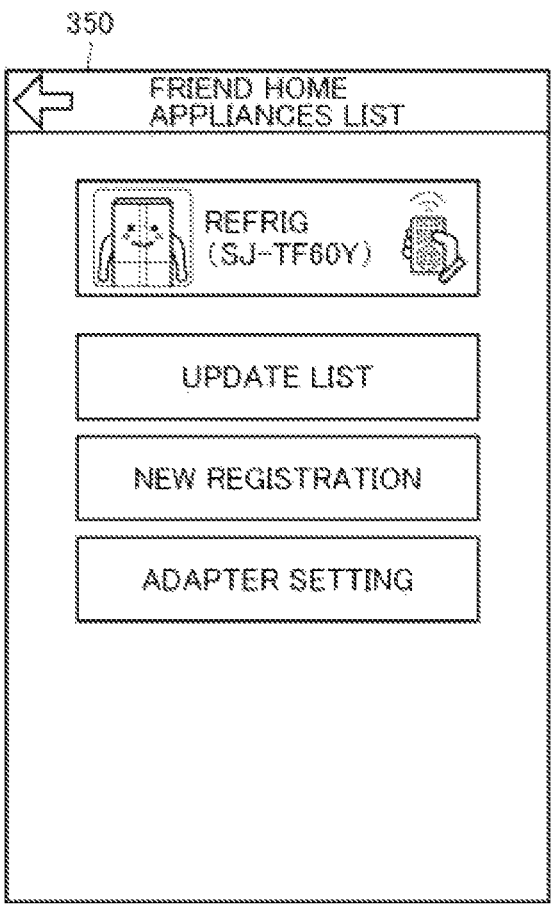
FIG. 13 is a schematic diagram representing a sixth screen example of the touch panel 350 in the terminal 300 according to the embodiment.

At the completion of the pairing, the processor 310 of the terminal 300 displays information in the touch panel 350 that the device 200 has become controllable, as shown in FIG. 13. In the present embodiment, the information displayed in the touch panel 350 by the processor 310 of terminal 300 includes texts and images concerning the device 200, and icons that indicate that instructions are sendable to the device 200.

The present embodiment also provides a safe and easy way for a second user to remote control the device 200, or view information of the device 200, as follows.

First, a second user via the terminal 300 makes user registration in the group server 100B having access to the database 101 (step S120). The server 100 registers the user ID in the user database 101A by associating the user ID with the group ID associated with the first user. The second user registers a user ID and a password in the group server 100B, or obtain a user ID and a password from the group server 100B.

One way of joining the second user to the same group as the first user is to have the first user create a new group, and invite the second user to this new group. Alternatively, the second user may be joined to the existing group of the first user by having the server 100 request the second user to enter a password for the existing group of the first user, or enter the designated password for the existing group.

The second user then activates a device control application in the terminal 300, and enters an access request (a type of second request) to the terminal 300 (step S122). Specifically, the terminal 300 accepts the entry of the user ID and the password from the second user through the browser or of the device control application, and sends the user ID and the password to the server 100. The processor 110 of the server 100 authenticates the user ID and the password by accessing the database 101 or the group server 100B via the communication interface 160.

If the user ID and the password were successfully authenticated, the processor 110 of the server 100 refers to the database 101, and specifies the device that belong to the same group as the user ID (step S126). The processor 110 of the server 100 then sends the terminal 300 information concerning the device, including the identification information for identifying the device belonging to the same group as the user ID, via the communication interface 160 (step S128).

In response, the processor 310 of the terminal 300 displays the controllable device 200 in the touch panel 350, as shown in FIG. 13 for example.

Figure 14:
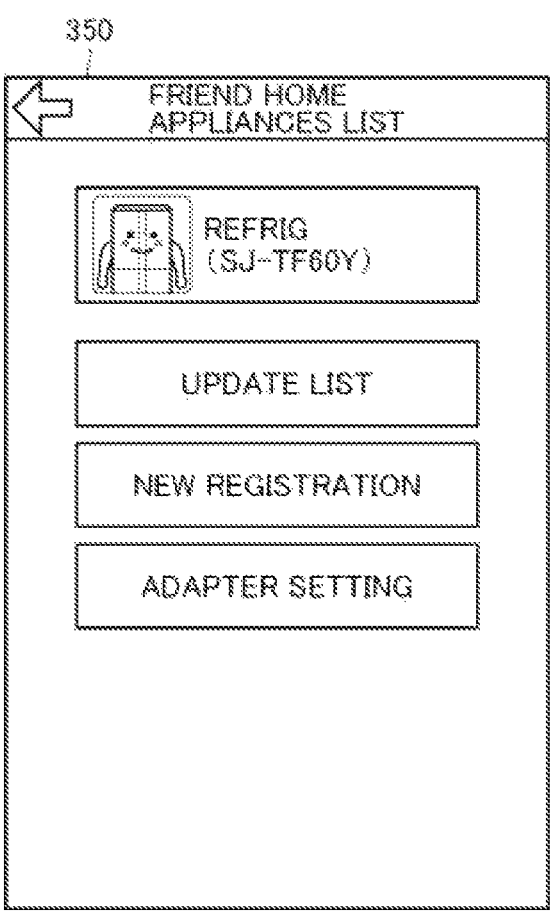
FIG. 14 is a schematic diagram representing a seventh screen example of the touch panel 350 in the terminal 300 according to the embodiment.

Alternatively, the processor 310 of the terminal 300 displays the device whose information is available for viewing, as shown in FIG. 14 for example. The information displayed in the touch panel 350 by the processor 310 of terminal 300 includes texts and images concerning the device 200, and icons that indicate that information is obtainable from the device 200.

The processor 310 of the terminal 300 accepts the user instruction for the device 200 via the touch panel 350, and sends the instruction to the server 100 via the communication interface 360 (step S130). The instruction may be one for controlling the device 200 (a type of second request), or one for obtaining operation information or state information from the device 200 (a type of second request). The processor 110 of the server 100 sends the control instruction from the terminal 300 to the device 200, or sends various types of information from the device 200 to the terminal 300 via the communication interface 160 (step S130).

<Information Process in Server 100>

Figure 15:
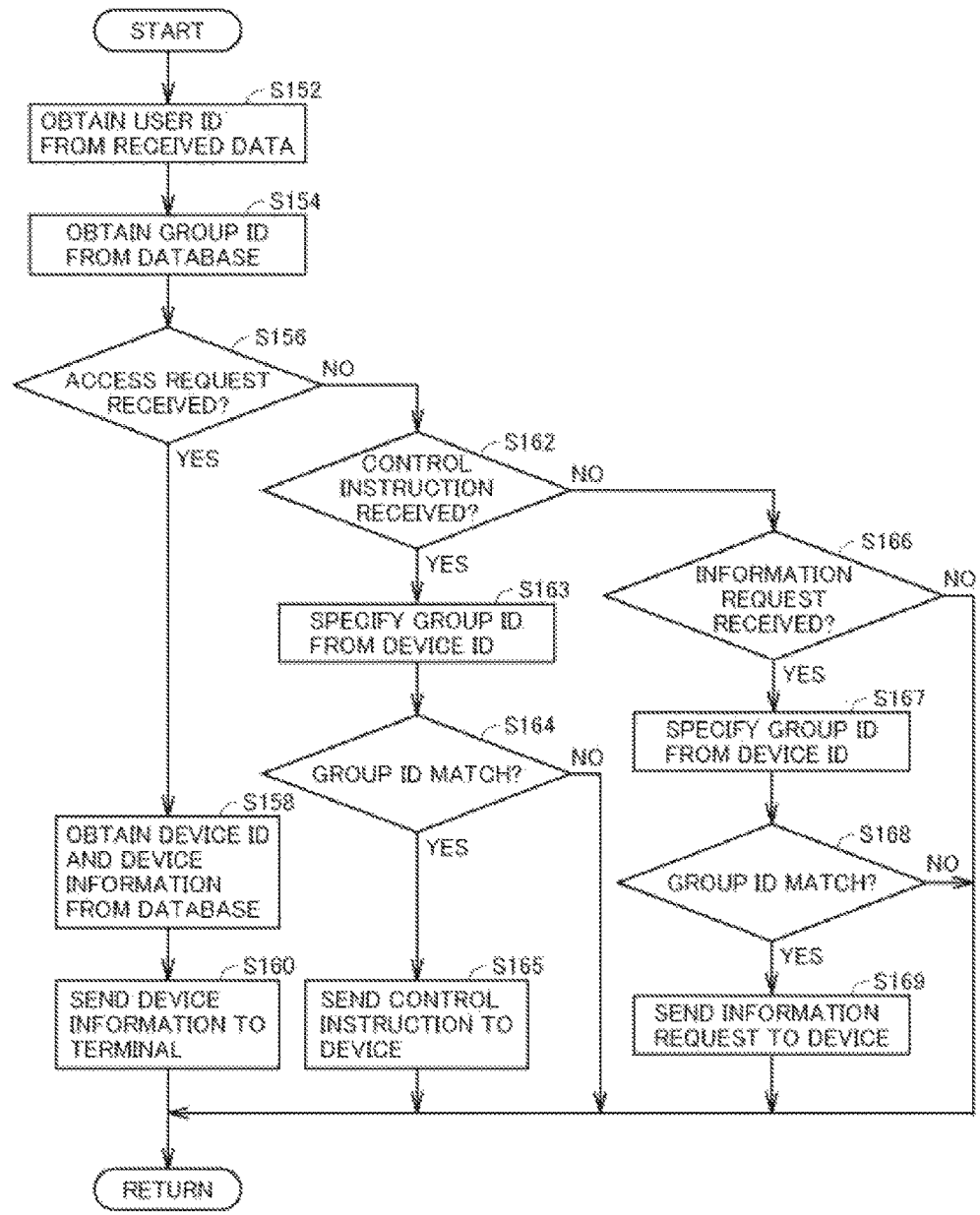
FIG. 15 is a flowchart representing the information process by the server 100 according to the embodiment.

The following describes the information process by the server 100 according to the present embodiment with reference to FIG. 15. FIG. 15 is a flowchart representing the information process by the server 100 according to the present embodiment.

The processor 110 of the server 100 performs the following processes upon receiving data from the terminal 300 via the communication interface 160. First, the processor 110 obtains the user ID from the received data (step S152). The processor 110 refers to the user database 101A, and specifies the group ID that is associated with the user ID (step S154).

The processor 110 determines whether the received data from the terminal 300 contains an access request (step S156). If it is determined that the received data contains an access request (YES in step S156), the processor 110 refers to the device database 101B, and specifies the device ID that is associated with the group ID (step S158). The processor 110 sends device information associated with the device ID to the terminal via the communication interface 160 (step S160). The processor 110 then waits for any further incoming data from the terminal via the communication interface 160.

If it is determined that the received data does not contain an access request (NO in step S156), the processor 110 determines whether the received data contains a control instruction for the device 200 (step S162). If the received data contains a control instruction for the device 200 (YES in step S162), the processor 110 specifies the group ID by using the device ID contained in the control instruction (step S163). The processor 110 determines whether the group ID matches the group ID obtained in step S154 (step S164). If the group ID matches the group ID obtained in step S154 (YES in step S164), the processor 110 sends the control instruction to the device 200 via the communication interface 160 (step S165). The processor 110 then waits for any further incoming data from the terminal 300 via the communication interface 160.

If the received data does not contain a control instruction for the device 200 (NO in step S162), the processor 110 determines whether the received data contains an information request (step S166). If the received data contains an information request (YES in step S166), the processor 110 specifies the group ID by using the device ID contained in the control instruction (step S167). The processor 110 determines whether the group ID matches the group ID obtained in step S154 (step S168). If the group ID matches the group ID obtained in step S154 (YES in step S168), the processor 110 via the communication interface 160 requests the device 200 to send the information (step S169). The processor 110 then sends the information from the device 200 to the terminal 300 via the communication interface 160 (not shown). The processor 110 then waits for any further incoming data from the terminal 300 via the communication interface 160.

In this way, a change in the group information of the user or the device can be reflected in making the decision to enable steps S165 and S169 in the services provided by the group server 100B and the server 100.

If the received data does not contain an information request (NO in step S166), the processor 110 waits for any further incoming data from the terminal 300 via the communication interface 160.

<Summary of Information Process by Network System 1>

Figure 16:
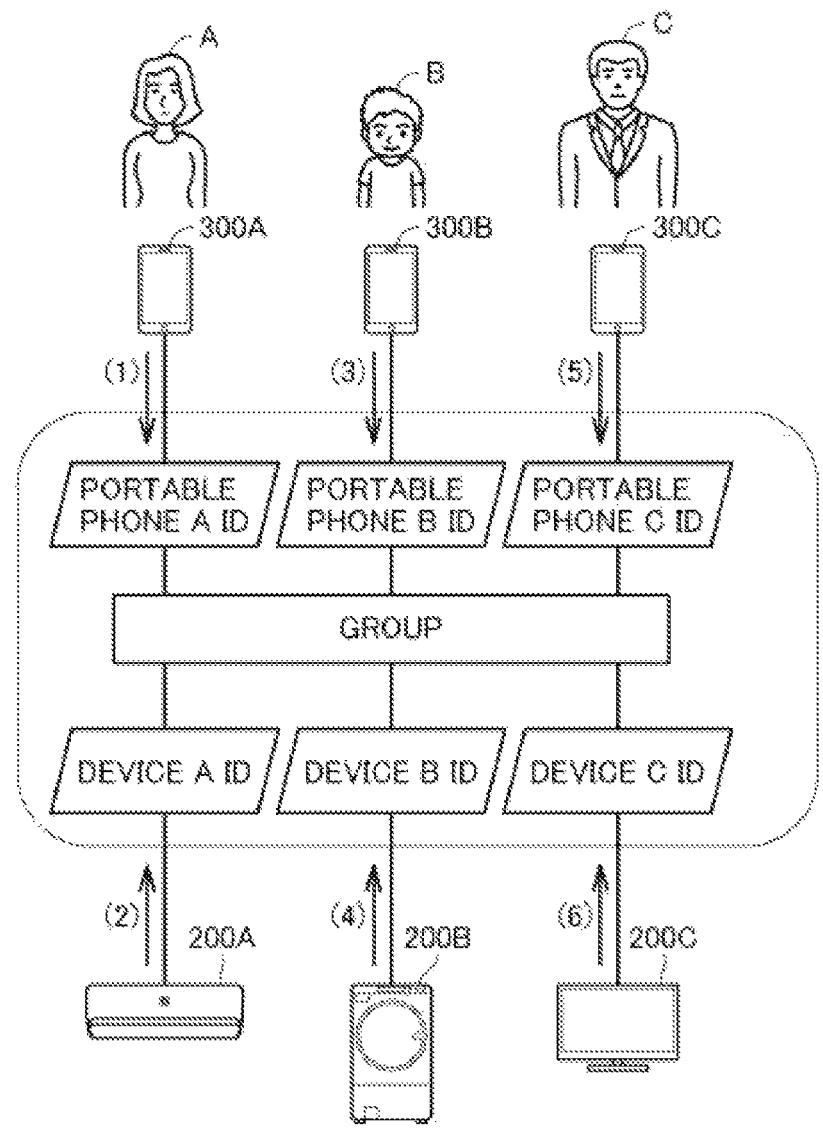
FIG. 16 is a schematic diagram representing the information process in the network system 1 according to the embodiment.

The following summarizes the information process by the network system 1 according to the present embodiment with reference to FIG. 16. FIG. 16 is a schematic diagram representing the information process by the network system 1 according to the present embodiment.

First, (1) a first user with a first terminal creates a first group in the group server 100B, and makes user registration as a member of the first group in the group server 100B. (2) The first user with the first terminal then registers a first device as a member device of the first group in the group server 100B. Here, the first user with the first terminal performs a pairing process to enable controlling the first device via the server 100.

(3) A second user with a second terminal makes user registration as a member of the first group in the group server 100B. In this way, the second user, belonging to the same group as the first device, is also able to control the first device, or view the information of the first device via the server 100, by using the second terminal.

(4) The second user with the second terminal then registers a second device as a member device of the first group in the group server 100B. Here, the second user with the second terminal performs a pairing process to enable controlling the second device via the server 100. In this way, the first user, belonging to the same group as the second device, is also able to control the second device, or view the information of the second device via the server 100, by using the first terminal.

(5) A third user with a third terminal makes user registration as a member of the first group in the group server 100B. In this way, the third user, belonging to the same group as the first and second devices, is also able to control the first and second devices, or view the information of the first and second devices via the server 100, by using the third terminal.

(6) The third user with the third terminal then registers a third device as a member device of the first group in the group server 100B. Here, the third user with the third terminal performs a pairing process to enable controlling the third device via the server 100. In this way, the first and second users, belonging to the same group as the third device, are also able to control the third device, or view the information of the third device via the server 100, by using the first and second terminals.

<Summary of First Variation of Information Process by Network System 1>

Figure 17:
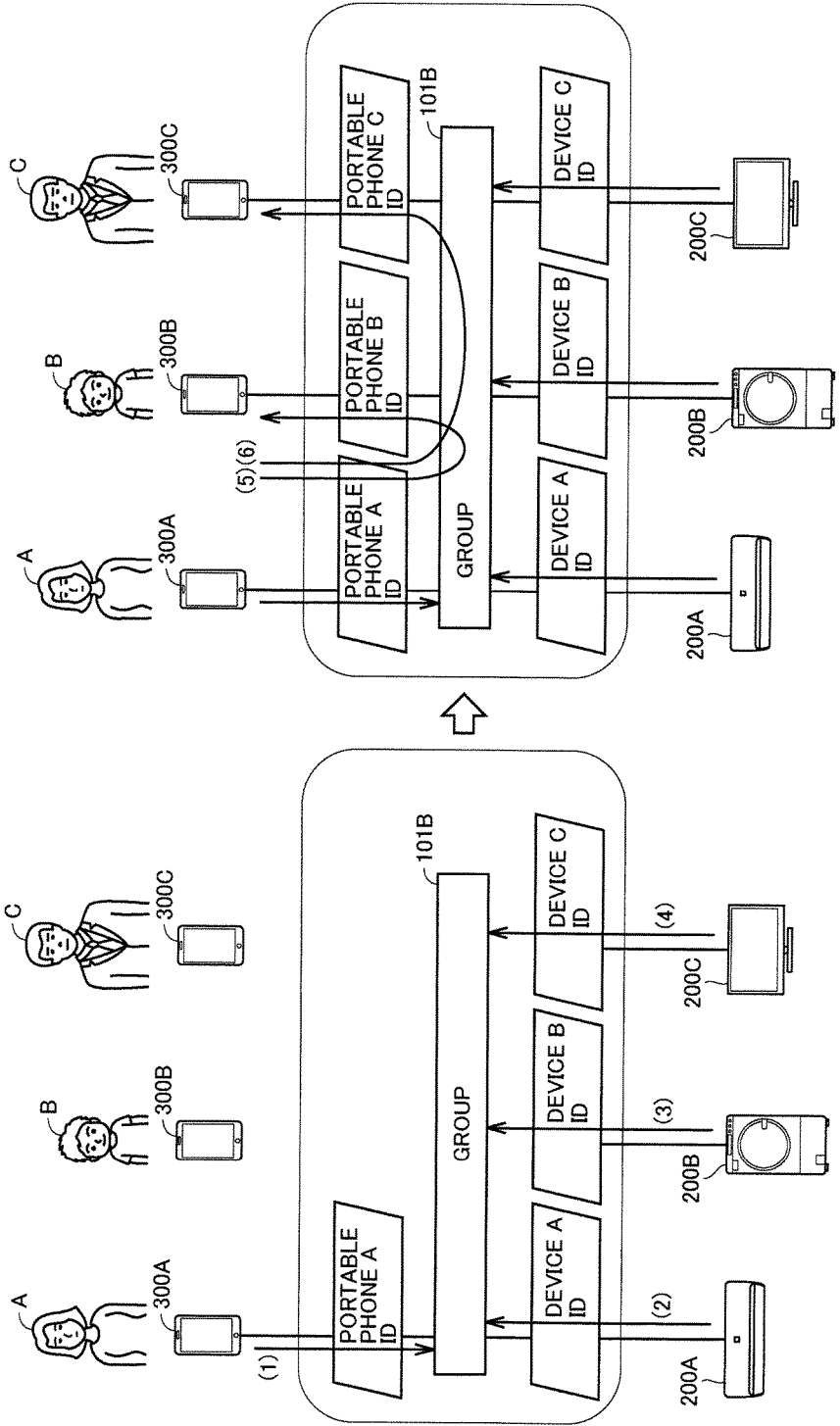
FIGS. 17(*a*) and 17(*b*) are schematic diagrams representing a first variation of the information process by the network system 1 according to the embodiment.

The following summarizes a first variation of the information process by the network system 1 according to the present embodiment with reference to FIGS. 17(*a*) and 17(*b*). FIGS. 17(*a*) and 17(*b*) are schematic diagrams representing the first variation of the information process by the network system 1 according to the present embodiment.

Referring to FIG. 17(*a*), (1) a first user with a first terminal creates a first group in the group server 100B, and makes user registration as a member of the first group in the group server 100B.

(2) The first user with the first terminal then registers a first device as a member device of the first group in the group server 100B. Here, the first user with the first terminal performs a pairing process to enable controlling the first device via the server 100.

(3) The first user with the first terminal registers a second device as a member device of the first group in the group server 100B. The first user with the first terminal performs a pairing process to enable controlling the second device via the server 100.

(4) The first user with the first terminal also registers a third device as a member device of the first group in the group server 100B. The first user with the first terminal then performs a pairing process to enable controlling the third device via the server 100.

Referring to FIG. 17(*b*), (5) the first user invites a second user to the first group via the group server 100B. In response to the invitation, the second user with a second terminal makes user registration as a member of the first group in the group server 100B. In this way, the second user, belonging to the same group as the first to third devices, is also able to control the first to third devices, or view the information of the first to third devices via the server 100, by using the second terminal.

The first user also invites a third user to the first group via the group server 100B. (6) In response to the invitation, the third user with a third terminal makes user registration as a member of the first group in the group server 100B. In this way, the third user, belonging to the same group as the first to third devices, is also able to control the first to third devices, or view the information of the first to third devices via the server 100, by using the third terminal.

<Summary of Second Variation of Information Process by Network System 1>

Figure 18:
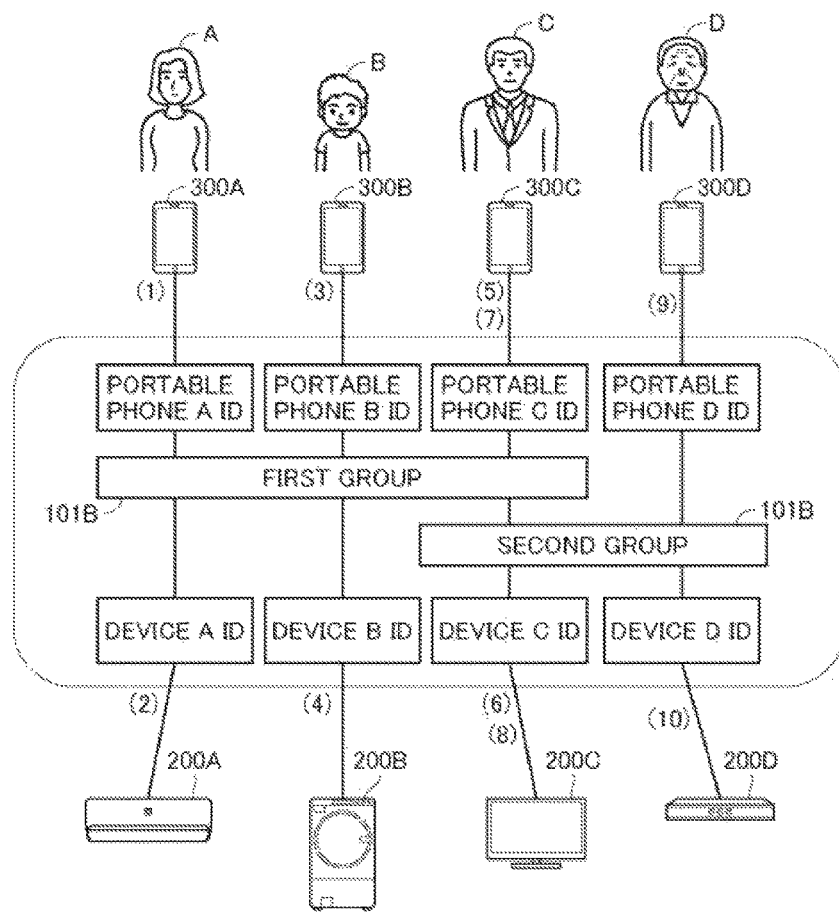
FIG. 18 is a schematic diagram representing a second variation of the information process by the network system 1 according to the embodiment.

The following summarizes a second variation of the information process by the network system 1 according to the present embodiment with reference to FIG. 18. Specifically, a second variation of the network system 1 is described in which users are permitted to belong to more than one group. FIG. 18 is a schematic diagram representing the second variation of the information process by the network system 1 according to the present embodiment.

The registration of first to third users, and the registration of first to third devices are the same as in FIGS. 16 and 17, and will not be described further.

(7) The third user with the third terminal creates a second group in the group server 100B, and makes user registration as a member of the second group in the group server 100B.

This may be performed, for example, by having the third user create a new group, and invite a fourth user to this newly created group.

(8) The third user with the third terminal pairs itself with a third device, and registers the third device as a member device of the second group in the group server 100B. Here, the pairing of the third user with the third device is possible because the third user belongs to the first group. It is, however, required that the group server 100B obtains a permission from the user of the first group or the owner of the third device to add the third device to the second group, specifically a permission to register the third device in two groups with redundancy. The third user with the third terminal then performs pairing to enable controlling the third device via the server 100.

(9) The fourth user with a fourth terminal makes a user registration as a member of the second group in the group server 100B. In this way, the fourth user, belonging to the same group as the third device, is also able to control the third device, or view the information of the third device via the server 100, by using the fourth terminal.

(10) The fourth user with the fourth terminal registers the fourth device as a member device of the second group in the group server 100B. The fourth user with the fourth terminal then performs pairing to enable controlling the fourth device via the server 100. In this way, the third user, belonging to the same group as the fourth device, is also able to control the fourth device, or view the information of the fourth device via the server 100, by using the third terminal.

Note that the fourth user does not belong to the first group, and is not able to control the first or second device, or view information of the first or second device. Likewise, the first and second users do not belong to the second group, and are not able to control the fourth device, or view information of the fourth device. The third user, on the other hand, belongs to the first and second groups, and is able to control the first to fourth devices, or view information of the first to fourth devices.

<First Use Case of Network System 1>

Figure 19A:
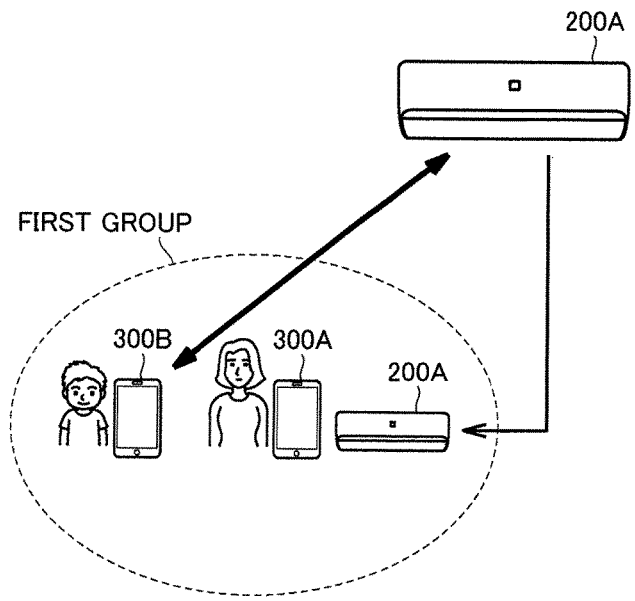
FIGS. 19(*a*) and 19(*b*) are schematic diagrams representing a first use case of the network system 1 according to the embodiment.
Figure 19B:
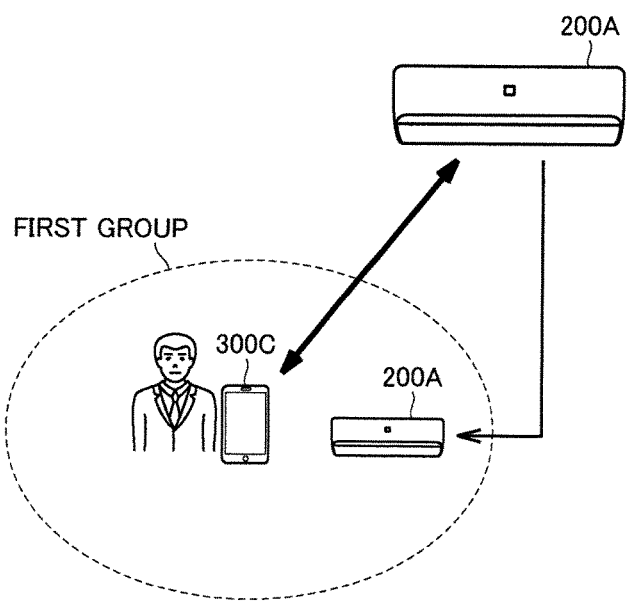

The following specifically describes a first use case of the network system 1 according to the present embodiment with reference to FIGS. 19(a) and 19(b). FIGS. 19(a) and 19(b) are schematic diagrams representing the first use case of the network system 1 according to the present embodiment.

In the present embodiment, a newly purchased and installed device can be paired with any user registered in the group server 100B. Conversely, a user not registered in the group server 100B cannot be paired with the device in the network system 1 according to the present embodiment.

Specifically, a newly purchased and installed device (air conditioner 200A) does not belong to any group, and can be paired with the first and second users belonging to the first group, as shown in FIG. 19(a). By not belonging to any group, the newly purchased and installed device can also pair itself with the third user belonging to the second group, as shown in FIG. 19(b).

<Second Use Case of Network System 1>

Figure 20:
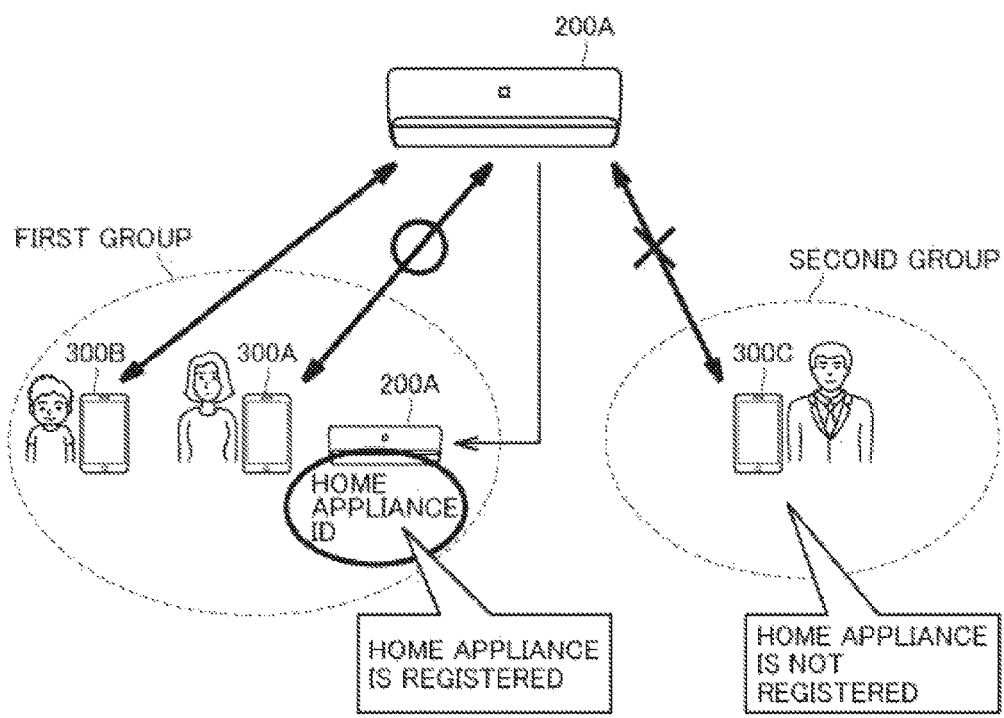
FIG. 20 is a first schematic diagram representing a second use case of the network system 1 according to the embodiment.

The following specifically describes a second use case of the network system 1 according to the present embodiment with reference to FIG. 20. FIG. 20 is a first schematic diagram representing the second use case of the network system 1 according to the present embodiment.

The first device (air conditioner 200A) that has been paired with the first user through the first terminal (smartphone 300A) cannot be paired with the third user when the third user does not belong to the same group as the first device. Specifically, the server 100 does not allow pairing of the first device with the terminal of the third user when the third user has logged in the device control application of the third terminal (smartphone 300C) with a user ID that does not belong to the same group as the first user.

Figure 21:
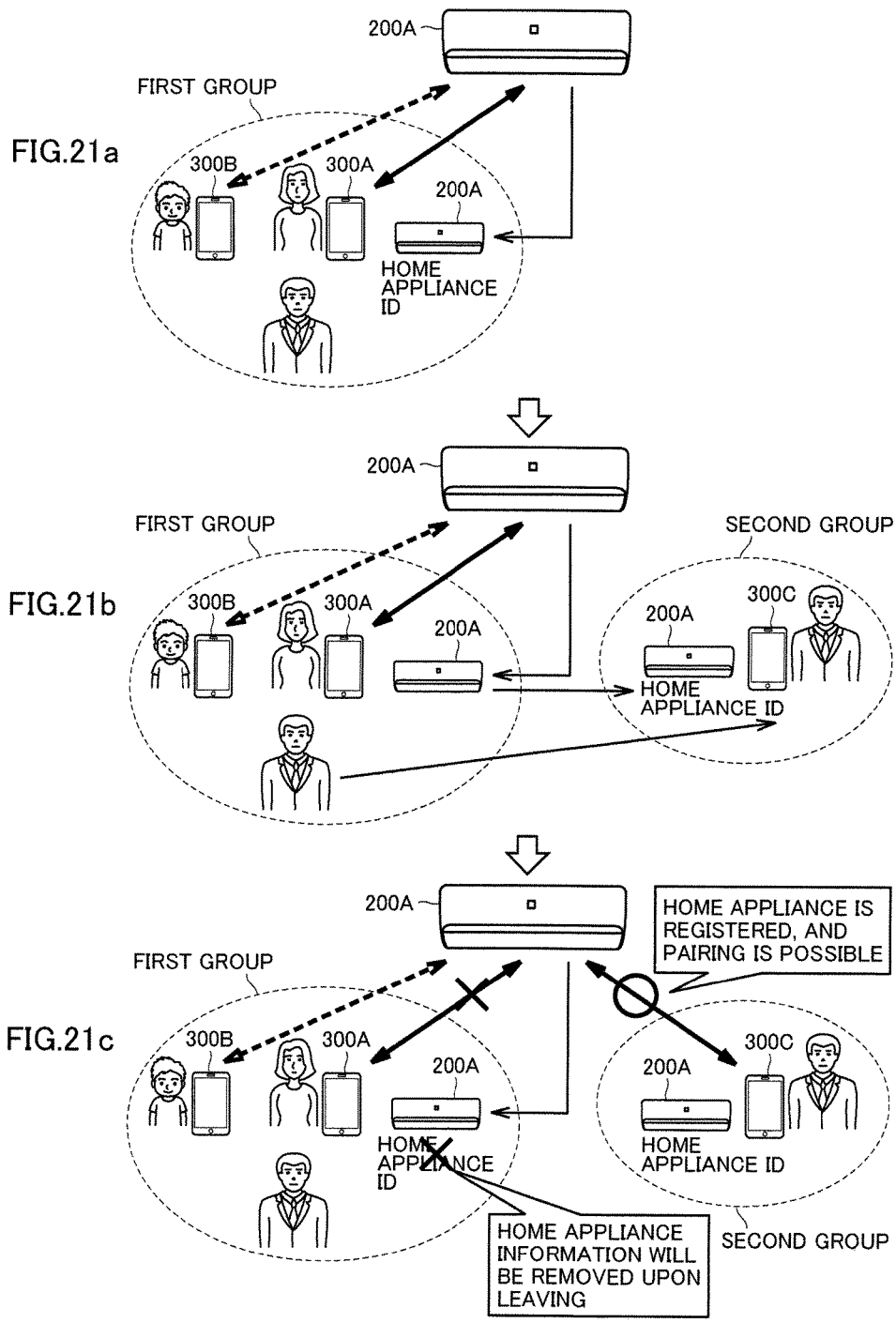
FIGS. 21(*a*) to 21(*c*) are second schematic diagrams representing the second use case of the network system 1 according to the embodiment.

The following add to the explanation of the second use case. The second use case of the network system 1 according to the present embodiment is further described with reference to FIGS. 21(a) to 21(c). FIGS. 21(a) to 21(c) are second schematic diagrams representing the second use case of the network system 1 according to the present embodiment.

Assume here that the first to third users belong to the same group, and that at least the first user has paired the first terminal (smartphone 300A) with the device (air conditioner 200A) as shown in FIG. 21(a). In the present embodiment, the third user can remove itself from the group, and create a new group, as shown in FIG. 21(b). The third user can then bring the device to the new group. Specifically, the device becomes associated with a new group ID.

In this case, as shown in FIG. 21(c), while the third user is allowed to pair the third terminal (smartphone 300C) with the device, the first and second users are unable to pair the first and second terminals with the device because the first and second users no longer belong to the same group as the device.

<Third Use Case of Network System 1>

Figure 22:
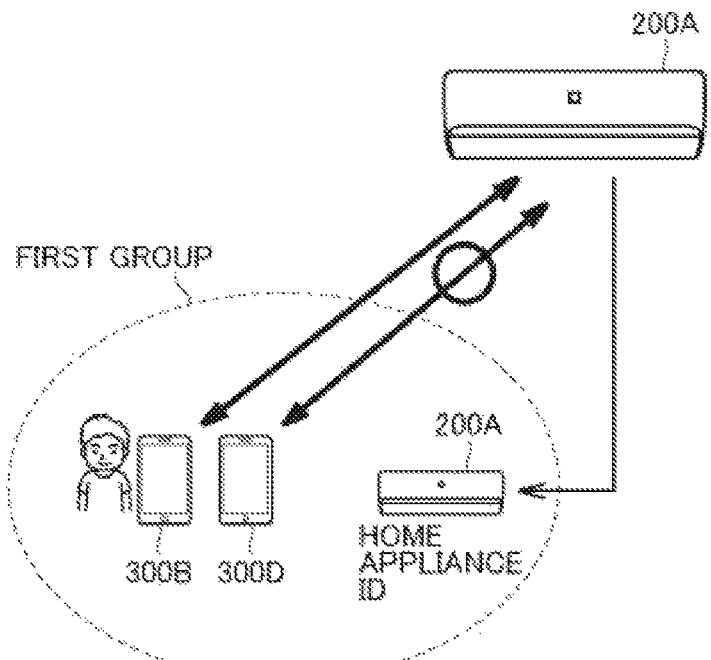
FIG. 22 is a schematic diagram representing a third use case of the network system 1 according to the embodiment.

The following specifically describes a third use case of the network system 1 according to the present embodiment with reference to FIG. 22. FIG. 22 is a schematic diagram representing the third use case of the network system 1 according to the present embodiment.

The network system 1 according to the present embodiment can accommodate a change of the smartphone 300B by a user belonging to the same group as the device (air conditioner 200A). In the network system 1 according to the present embodiment, a user belonging to the same group as the device also can pair itself with the device through another smartphone 300D. In other words, the second user uses the same user ID to control or view the device through the second or fourth terminal when the device can be controlled or viewed through the second terminal with the second user's ID. Other details are as described in the second use case, and will not be described.

<Fourth Use Case of Network System 1>

Figure 23:
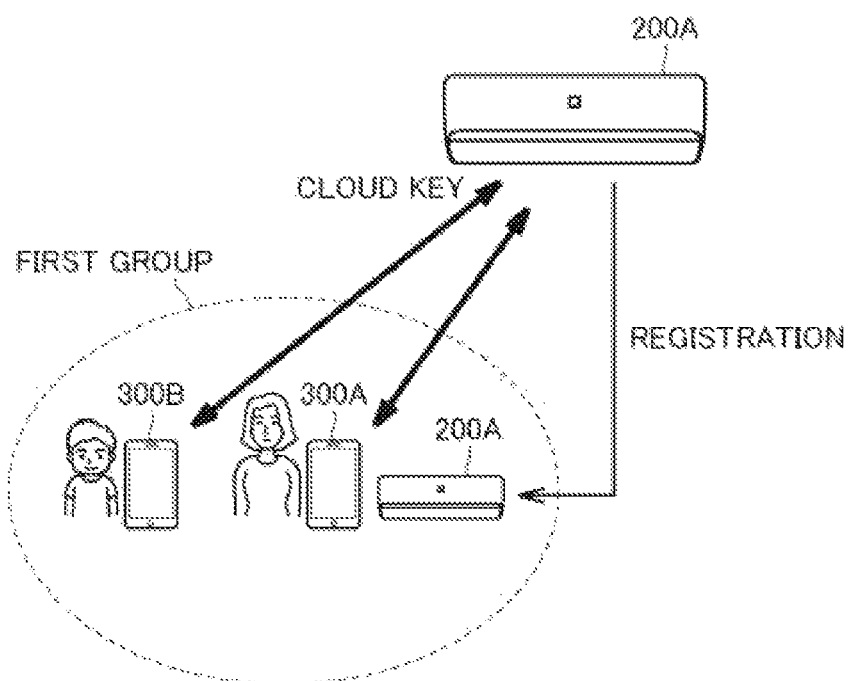
FIG. 23 is a schematic diagram representing a fourth use case of the network system 1 according to the embodiment.

The following specifically describes a fourth use case of the network system 1 according to the present embodiment with reference to FIG. 23. FIG. 23 is a schematic diagram representing the fourth use case of the network system 1 according to the present embodiment.

The group server 100B in the network system 1 according to the present embodiment is configured so that a device registered in a given group cannot be registered in the same group with redundancy. For example, the group server 100B or the server 100 allocates a device ID to a device, and the group server 100B, by using the key, prevents the same device from being registered in the same group with redundancy. The group server 100B may prevent the redundant registration of the same device in the same group by using the MAC address allocated to the device.

<Fifth Use Case of Network System 1>

Figure 24:
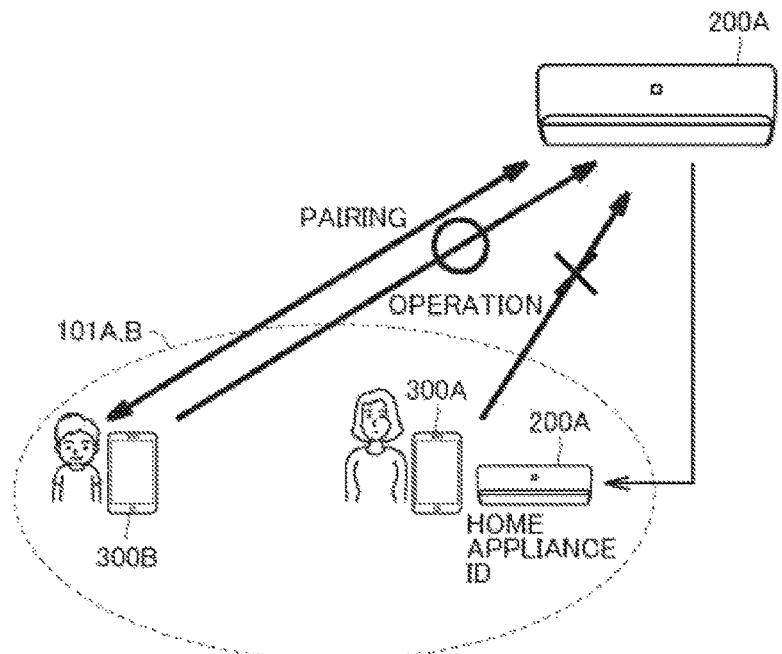
FIG. 24 is a schematic diagram representing a fifth use case of the network system 1 according to the embodiment.

The following describes a fifth use case of the network system 1 according to the present embodiment with reference to FIG. 24. FIG. 24 is a schematic diagram representing the fifth use case of the network system 1 according to the present embodiment.

The network system 1 may be adapted so that, depending on the type of the device control application or the device control service, the device (air conditioner 200A) being paired with the second user through the second terminal (smartphone 300B) may not be controlled by the first user through the first terminal even when the first user belongs to the same group as the device.

<Sixth Use Case of Network System 1>

Figure 25:
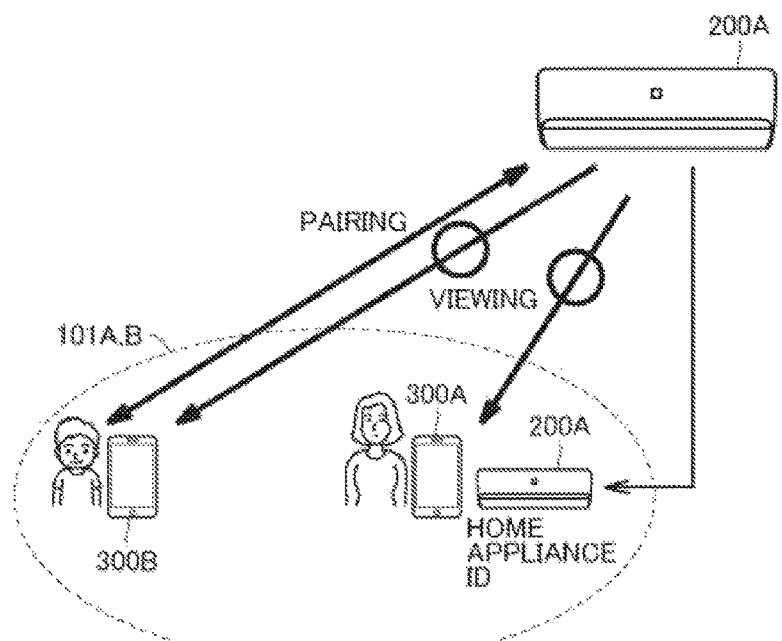
FIG. 25 is a first schematic diagram representing a sixth use case of the network system 1 according to the embodiment.

The following describes a sixth use case of the network system 1 according to the present embodiment with reference to FIG. 25. FIG. 25 is a first schematic diagram representing the sixth use case of the network system 1 according to the present embodiment.

The network system 1 may be adapted so that, depending on the type of the device control application or the device control service, the information of the device (air conditioner 200A) being paired with the second user through the second terminal (smartphone 300B) can be viewed by the first user through the first terminal, as long as the first user belongs to the same group as the device.

Specifically, a user that has paired itself with the device first is allowed to send a control instruction to the device, as in the fifth and the sixth use case. However, a user that was not paired with the device first is not allowed to control the device when the user is in the same group as the device, though the user is allowed to obtain information from the device. The network system 1, however, may be adapted so that, depending on the type of the device control application or the device control service, a user that was not paired with the device first is also allowed to control the device in addition to being allowed to obtain information from the device, as long as the user is in the same group as the device.

Figure 26:
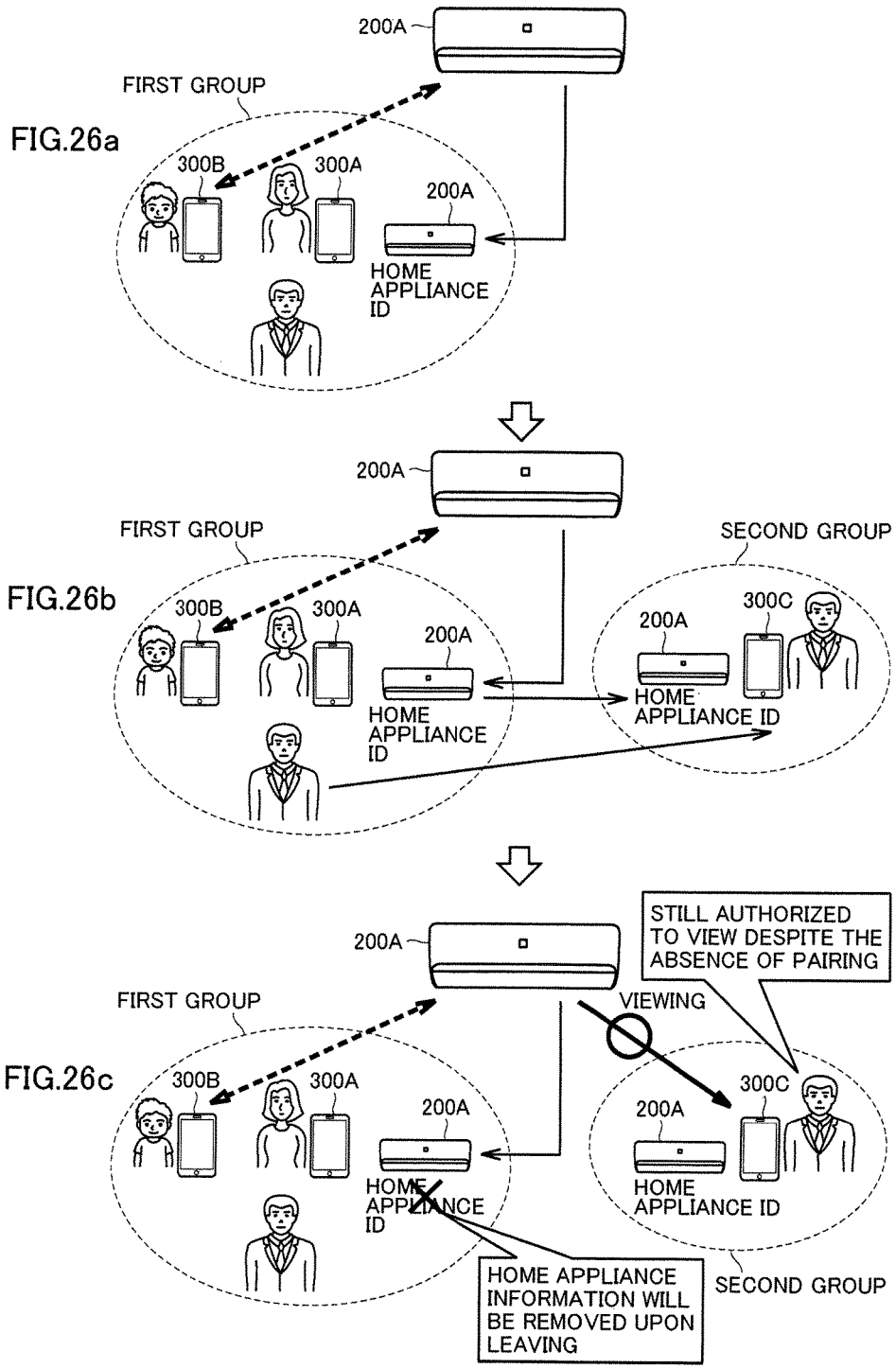
FIGS. 26(*a*) to 26(*c*) are second schematic diagrams representing the sixth use case of the network system 1 according to the embodiment.

The following adds to the explanation of the sixth use case. The sixth use case of the network system 1 according to the present embodiment is further described below with reference to FIGS. 26(a) to 26(c). FIGS. 26(a) to 26(c) are second schematic diagrams representing the sixth use case of the network system 1 according to the present embodiment.

Assume here that the first to third users belong to the same group, and that the second user has paired the second terminal (smartphone 300B) with the device (air conditioner 200A) as shown in FIG. 26(a). In the present embodiment, the third user can remove itself from the group, and create a new group, as shown in FIG. 26(b). The third user can then bring the device to the new group. Specifically, the device becomes associated with a new group ID.

Depending on the type of the application or the service, the third user continues to have the authorization to view the information of the device through the third terminal even in the absence of the pairing between the third terminal (smartphone 300C) and the device, as shown in FIG. 26(c). Specifically, the server 100 obtains information from the device, and sends the information to the third terminal at the request of the third user originally belonged to the same group as the device.

<Seventh Use Case of Network System 1>

Figure 27:
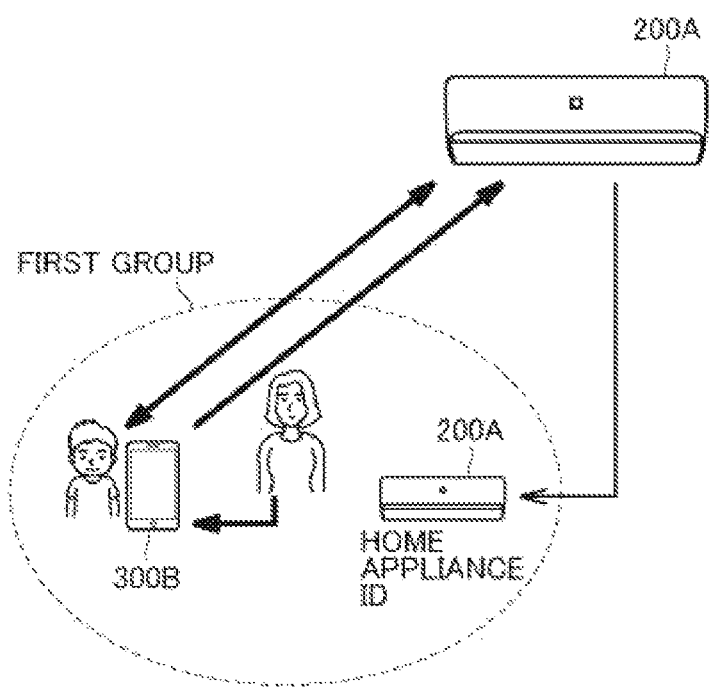
FIG. 27 is a schematic diagram representing a seventh use case of the network system 1 according to the embodiment.

The following describes a seventh use case of the network system 1 according to the present embodiment with reference to FIG. 27. FIG. 27 is a schematic diagram representing the seventh use case of the network system 1 according to the present embodiment.

In the present embodiment, a first user is allowed to log in with the first user ID through the second terminal, and control the device (air conditioner 200A) or obtain information of the device when the device is paired with a second user through the device control application of the second terminal (smartphone 300B). Whether to allow the first user to control the device or view information of the device through the second terminal may preferably be decided according to the type of the device control application or the device control service.

<Eighth Use Case of Network System 1>

Figure 28A:
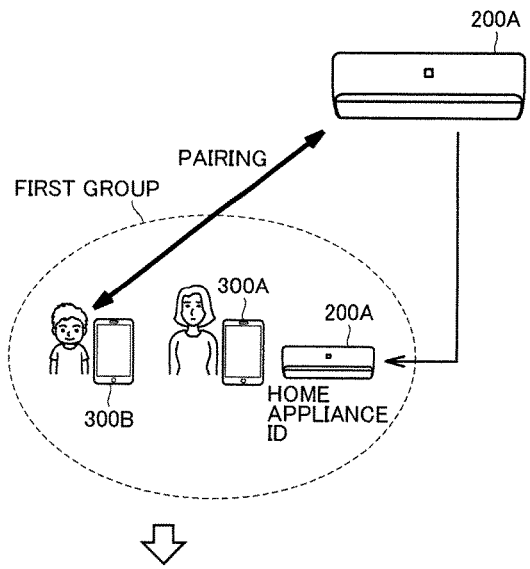
FIGS. 28(a) and 28(b) are schematic diagrams representing an eighth use case of the network system 1 according to the embodiment.
Figure 28B:
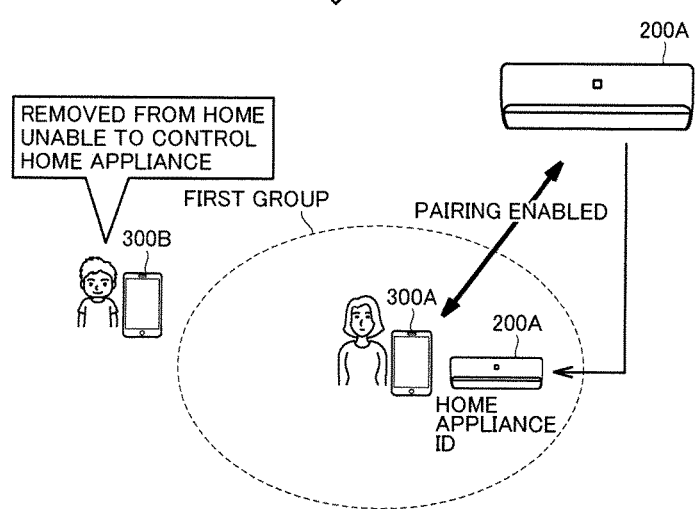

The following describes an eighth use case of the network system 1 according to the present embodiment with reference to FIGS. 28(a) and 28(b). FIGS. 28(a) and 28(b) are schematic diagrams representing the eighth use case of the network system 1 according to the present embodiment.

In the present embodiment, the group server 100B may decide that the user registering the device 200 in a group first is the owner of the device 200. For example, a first user registering the air conditioner 200 in a first user group in the group server 100B after the installation of the air conditioner 200A is regarded as the owner of the air conditioner 200A. A second user belonging to the same group as the first user and the air conditioner 200A may subsequently pair itself with the air conditioner 200A through the second terminal (smartphone 300B).

In this state, the owner of the air conditioner 200A may remove other users from the group in the group server 100B, or may prohibit other users from controlling the air conditioner 200A or viewing information of the air conditioner 200A, without removing these users from the group.

For example, as shown in FIG. 28(b), a first user as the owner of the air conditioner 200A removes a second user from the group. The group server 100B and the server 100 then automatically cancel the pairing of the second user and the air conditioner 200A, and prohibits the second user from controlling the air conditioner 200A or viewing information of the air conditioner 200A.

<Ninth Use Case of Network System 1>

Figure 29:
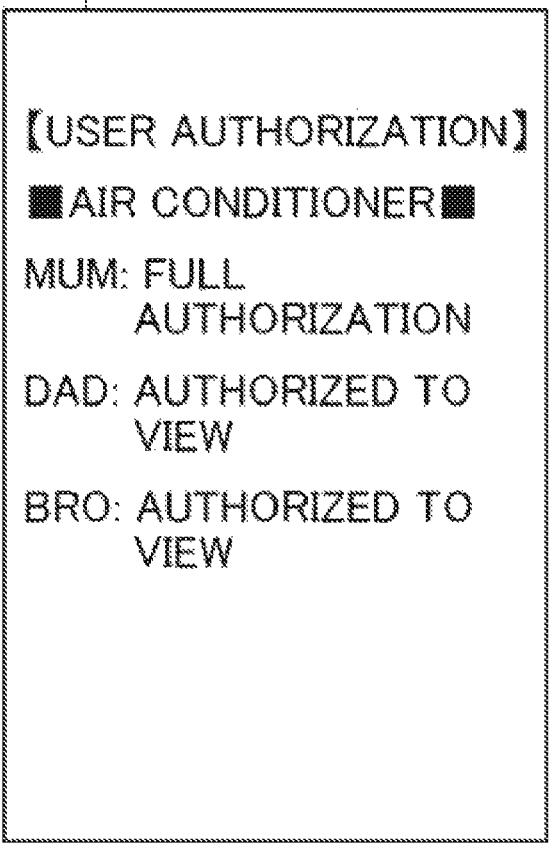
FIG. 29 is a schematic diagram representing a ninth use case of the network system 1 according to the embodiment.

The following describes a ninth use case of the network system 1 according to the present embodiment with reference to FIG. 29. FIG. 29 is a schematic diagram representing the ninth use case of the network system 1 according to the present embodiment.

In the present embodiment, the server 100, in response to a request for authorization information from a user through the terminal 300, sends the terminal 300 information indicative of whether the users belonging to the same group as the requesting user have what levels of authorization for the device 200 designated by the user. Specifically, in this case, the server 100 or the database 101 stores the association between user and authorization level for each device 200, and the processor 110 sends the terminal the association between user and authorization level for the device 200 of interest via the communication interface 160.

By using the association sent from the server 100, the processor 310 of the terminal 300 displays information in the touch panel 350 to indicate that the users belonging to the same group as the device 200 have what levels of authorization for the device 200, as shown in FIG. 29. This allows the user to easily grasp whether there is an unintended user in the group, or whether authorization has been given to an unintended user.

<Summary of Network System 1>

As described above, in the network system 1 according to the present embodiment, the server 100, in response to a user requesting for controlling the device 200 or obtaining information of the device 200 through the terminal 300, determines whether to allow the request on the basis of whether the user and the device 200 belong to the same group.

The network system 1 according to the present embodiment can thus more easily and safely enable the terminal 300 to control the device 200 or obtain information from the device 200 than in related art. More specifically, the pairing process needed for the first pairing of the device 200 with a user is not required for the rest of the users, and the required process for the users is easier than in the systems of related art. The network system also has improved security because a user who is not a member of a group is prohibited from accessing or controlling the device 200, or viewing information of the device 200.

Second Embodiment

In First Embodiment, the data exchange between the terminal 300 and the device 200 directly takes place through wireless communications in steps S106 to S114 of FIG. 7. However, a user may enter identification information such as the MAC address of the device 200 to the terminal 300, and the pairing process may be completed without having the terminal 300 detecting the device 200 through wireless communications, as follows.

The following descriptions deal with the information process of the network system 1 according to the present embodiment, and the network system 1 will not be described with regard to the overall configuration and the hardware configuration of each component because these are the same as in First Embodiment.

Figure 30:
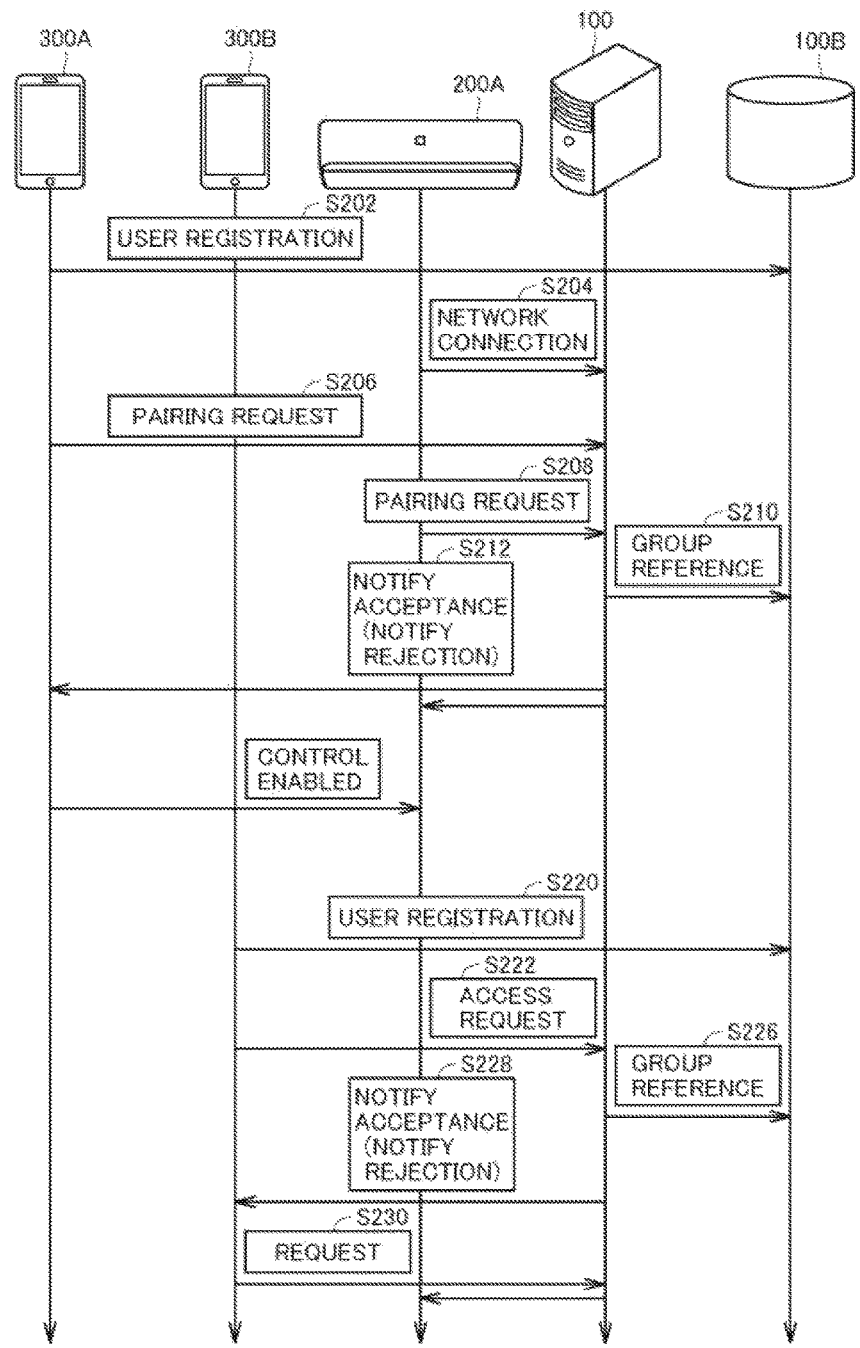
FIG. 30 is a sequence diagram representing the information process in the network system 1 according to Second Embodiment.

FIG. 30 is a sequence diagram representing the information process by the network system 1 according to the present embodiment. Referring to FIG. 30, the processes in steps S202 and S204 are not described because these are the same as in steps S102 and S104 in FIG. 7 of First Embodiment.

A first user enters the user ID, and the MAC address of the device 200 to the device control application of the first terminal 300. The processor 310 of the first terminal 300 makes a pairing request by sending the user ID and the MAC address to the server 100 via the communication interface 360 (step S206).

Here, the first user presses the pairing button in the device 200. The processor 210 of the device 200 sends its MAC address to the server 100 via the communication interface 260 (step S208).

The processor 110 of the server 100 receives the data from the first terminal 300 and the device 200 via the communication interface 160. The processor 110 refers to the database 101, and determines whether the MAC address of the device 200 has been registered in the group of the user (step S210).

If it is determined by referring to the database 101 that the device 200 has not been registered in the group of the user, the processor 110 of the server 100 determines whether the MAC address from the first terminal 300 matches the MAC address from the device 200. If there is a match in the MAC addresses from the first terminal 300 and the device 200, the processor 110 issues a device ID for remote control to the device 200, and sends the device ID also to the first terminal (step S212). The first terminal 300, with the device ID, can then control the device 200 via the server 100.

The processes in the subsequent steps S220 to S230 are not described because these are the same as in steps S120 to S130 in FIG. 7 of First Embodiment.

Third Embodiment

In the network systems according to First and Second Embodiments, the device is automatically registered in a group after the pairing process in steps S106 to S114 of FIG. 7. The network system, however, is not limited to this form. For example, a user may register a self-purchased device in his or her group before the pairing process.

The following descriptions deal with the information process of the network system 1 according to the present embodiment, and the network system 1 will not be described with regard to the overall configuration and the hardware configuration of each component because these are the same as in First Embodiment.

Figure 31:
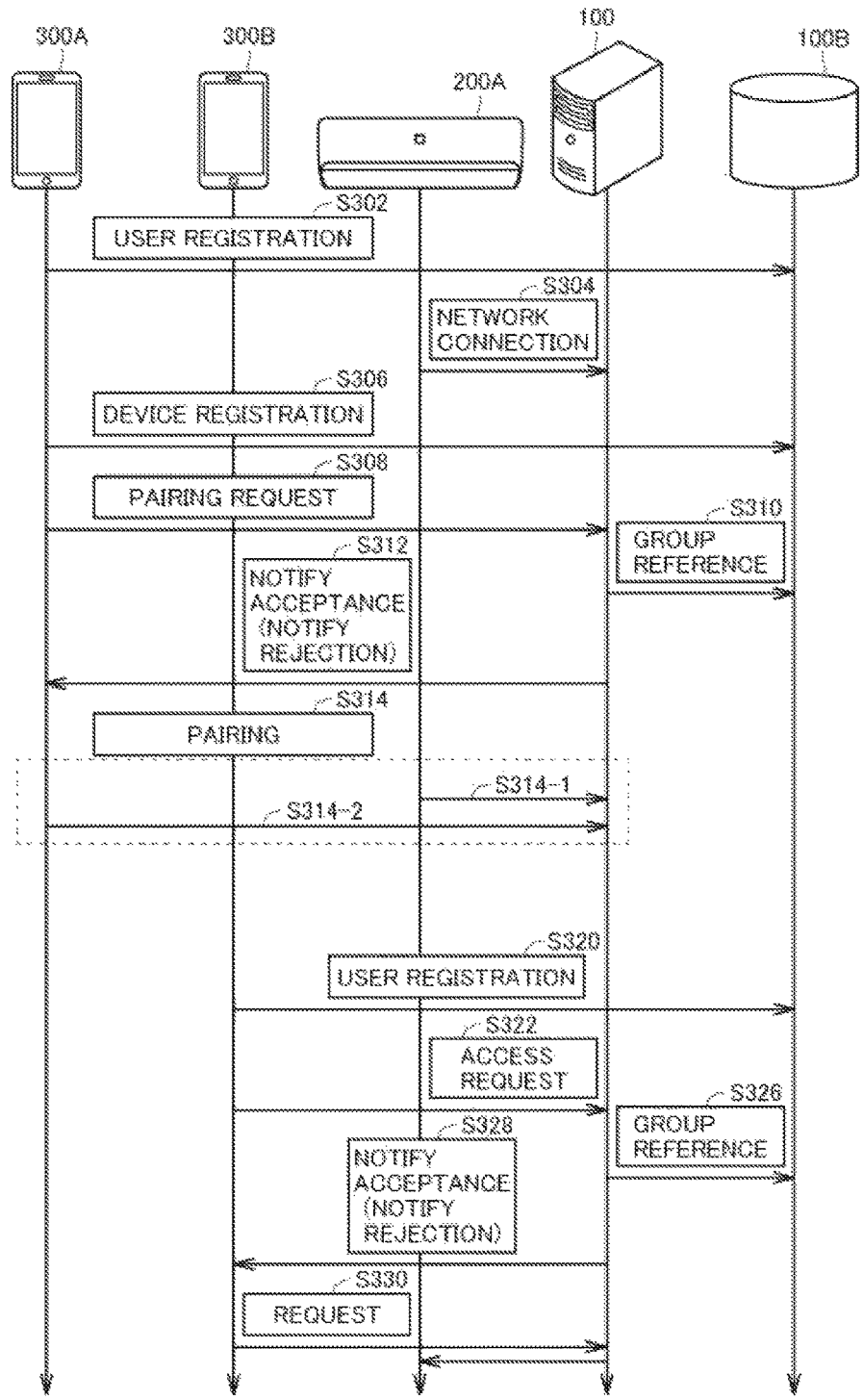
FIG. 31 is a sequence diagram representing the information process in the network system 1 according to Third Embodiment.

FIG. 31 is a sequence diagram representing the information process by the network system 1 according to the present embodiment. Referring to FIG. 31, the processes in steps S302 and S304 are not described because these are the same as in steps S102 and S104 in FIG. 7 of First Embodiment.

The first user via the first terminal 300 makes device registration in the group server 100B having access to the database 101 (step S306). Specifically, the first user registers various information of the device 200, including, for example, the model number, and the MAC address, in the group server 100B by associating the information with the user ID and the group ID. In the group server 100B, the user registering the device 200 is recognized as the owner of the device 200.

The first user then activates a device control application in the terminal 300 to start a pairing process with the device 200.

Specifically, as shown in FIG. 8, the processor 310 of the terminal 300 accepts entry of the user ID and the password from the first user through the browser of the device control application. The processor 310 makes a pairing request by sending the user ID and the password to the server 100 via the communication interface 360 (step S308).

The processor 110 of the server 100 accesses the database 101 or the group server 100B via the communication interface 160, and authenticates the user ID and the password. When the server 100 has successfully authenticated the user ID and the password, the processor 310 of the terminal 300 accepts an instruction for starting a setting for a new control target through the touch panel 350, as shown in FIG. 9.

The processor 110 of the server 100 accepts the instruction from the terminal 300 via the communication interface 160. The processor 110 refers to the database 101, and specifies the device ID that is associated with the user ID (step S310). The processor 110 sends the terminal 300 the device information associated with the device ID via the communication interface 160 (step S312). Specifically, the processor 110 of the server 100 sends the terminal 300 the information of the device 200 belonging to the same group as the first user.

By using the data from the server 100, the processor 310 of the terminal 300 displays selectable information on the touch panel 350 concerning the device that is available for pairing, as shown in FIG. 10. The processor 310 of the terminal 300 via the touch panel 350 then accepts entry of information concerning installation of the device, as shown in FIG. 11. Here, the processor 310 may accept the MAC address or the model number from the user, or may receive the MAC address, the model number, or other such identification information from the device.

With the information entered, the processor 310 of the terminal 300 starts the pairing process with the device 200 (step S314). Specifically, as shown in FIG. 12, the processor 310 of the terminal 300 displays the pairing procedures for the device 200 and the terminal 300 in the touch panel 350. At the press of a pairing button by the user, the processor 210 of the device 200 sends the MAC address, the model number, or other such identification information to the server 100 via the communication interface 260 (step S314-1).

At the press of a link button in the terminal 300, the processor 310 of the terminal 300 sends the identification information to the server 100 (step S314-2). The processor 110 of the server 100 determines whether the MAC address, the model number, or other such identification information designated by the terminal 300 matches the MAC address, the model number, or other such identification information received from the device 200. If the information designated by the terminal 300 matches the information received from the device 200, the processor 110 notifies the terminal 300 of the completion of the pairing via the communication interface 160. Once the pairing is established, the user can remote control the device 200 via the terminal 300.

At the completion of the pairing, the processor 310 of the terminal 300 displays information in the touch panel 350 that the device 200 has become controllable, as shown in FIG. 13. In the present embodiment, the information displayed in the touch panel 350 by the processor 310 of terminal 300 includes texts and images concerning the device 200, and icons that indicate that instructions are sendable to the device 200.

The processes in the subsequent steps S320 to S330 are not described because these are the same as in steps S120 to S130 in FIG. 7 of First Embodiment.

Fourth Embodiment

The network system according to Fourth Embodiment does not differ from the network system 1 of First or Second Embodiment except that a first user having been allowed to control the device 200 can additionally invite a second user to the group. In the present embodiment, such an invitation is made with the use of the group server 100B. The following descriptions deal with the information process of the network system 1 according to the present embodiment, and the network system 1 will not be described with regard to the overall configuration and the hardware configuration of each component because these are the same as in First Embodiment.

Figure 32:
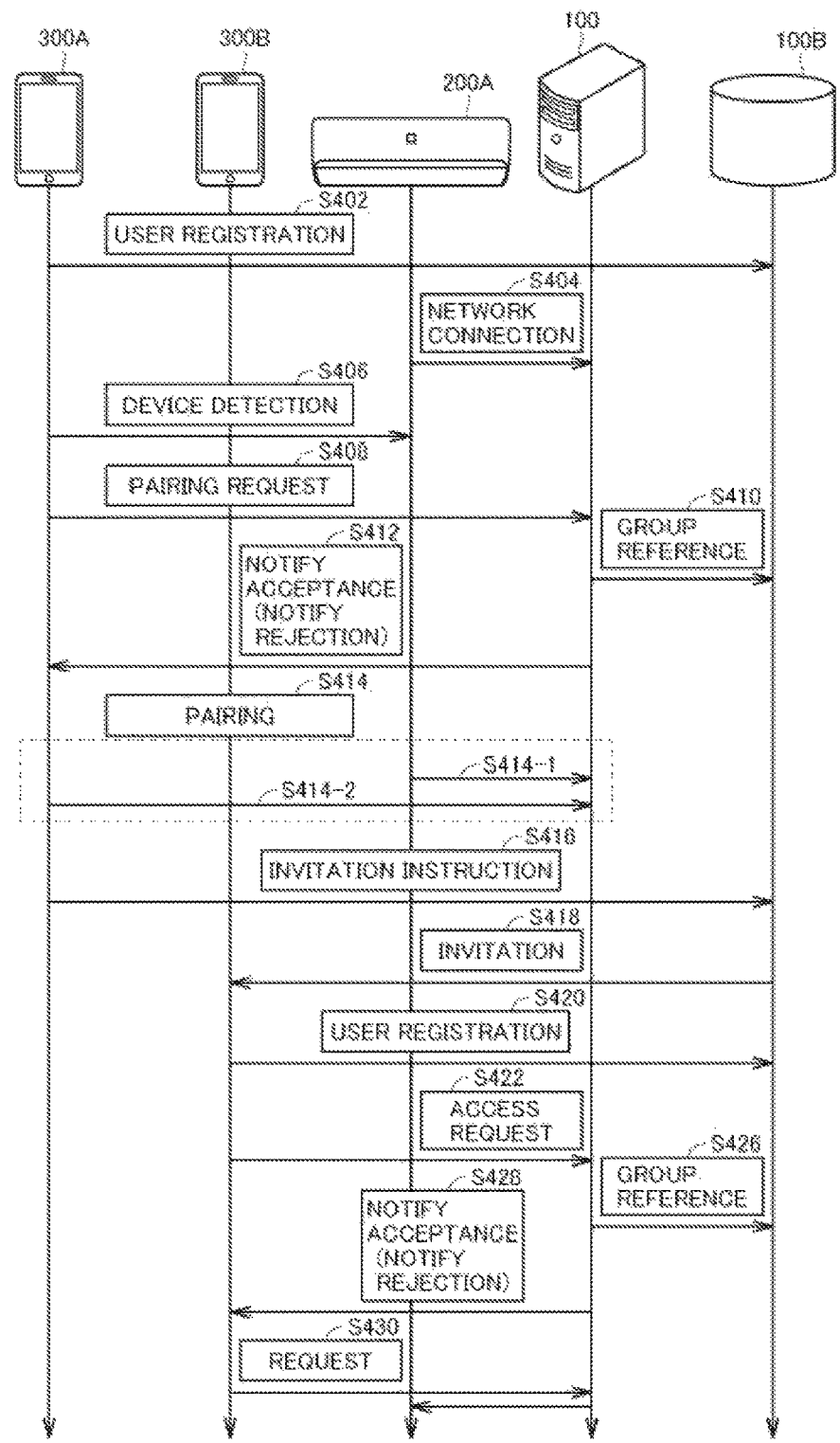
FIG. 32 is a sequence diagram representing the information process in the network system 1 according to Fourth Embodiment.

FIG. 32 is a sequence diagram representing the information process by the network system 1 according to the present embodiment. Referring to FIG. 32, the processes from steps S402 to S414, specifically the processes for pairing the first user with the device 200 through the first terminal 300 are not described because these are the same as in steps S102 to S114 in FIG. 7 of First Embodiment.

The first user invites a second user to a first group. Specifically, the first user with the first terminal 300 sends the group server 100B an instruction for inviting the second user (step S416). The group server 100B sends the second terminal 300 of the second user a notification for inviting the second user to add the second terminal 300 to the group (step S418).

In response to the invitation notification, the second user with the second terminal 300 resisters itself as a member of the first group in the group server 100B having access to the database 101 (step S420). The server 100 resisters the user ID in the user database 101A by associating the user ID with the group ID associated with the first user. The second user registers a user ID and a password in the group server 100B, or obtain a user ID and a password from the group server 100B.

The processes in the subsequent steps S422 to S430 are not described because these are the same as in steps S122 to S130 in FIG. 7 of First Embodiment.

Fifth Embodiment

The network system according to Fifth Embodiment does not differ from the network system 1 of First or Second Embodiment except that the first user having been allowed to control the device 200 can additionally invite a second user to the group. The difference from the network system of Fourth Embodiment is that the present embodiment does not necessarily require the group server 100B to make an invitation.

Figure 33:
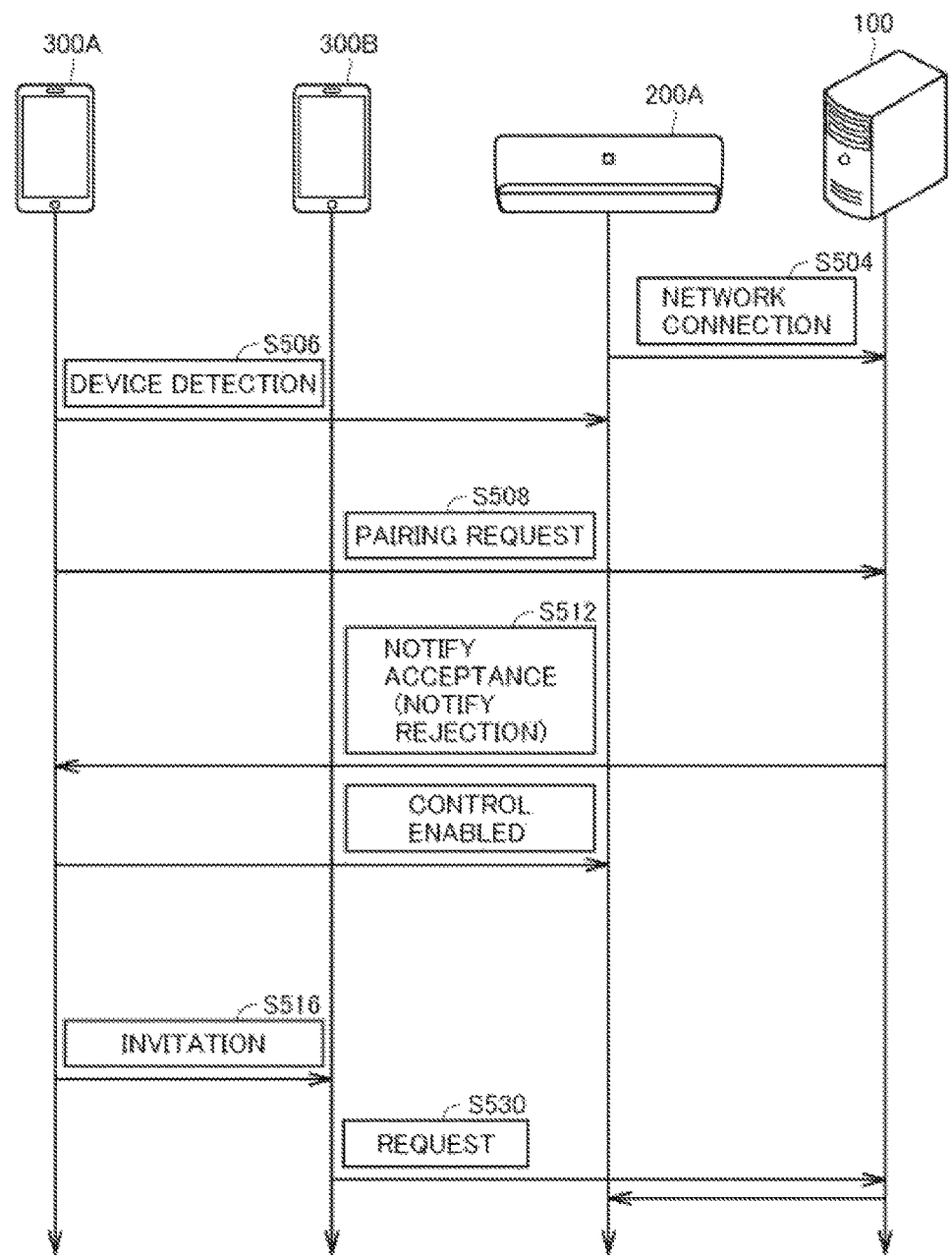
FIG. 33 is a sequence diagram representing the information process in the network system 1 according to Fifth Embodiment.

Referring to FIG. 33, the following describes the information process by the network system 1 according to the present embodiment. The network system 1 will not be described with regard to the overall configuration and the hardware configuration of each component because these are the same as in First Embodiment. FIG. 33 is a sequence diagram representing the information process by the network system 1 according to the present embodiment.

First, the device 200 is installed in the home of a first user. The device 200 starts communicating with the server 100 via, for example, wireless LAN or the Internet (step S504). Here, the server 100 grants identification information for communications to the device 200. The server 100 stores the association of the identification information with the MAC address.

The first user then activates a device control application in the first terminal 300 to start a pairing process with the device 200.

Specifically, as shown in FIG. 8, the processor 310 of the first terminal 300 accepts entry of a user ID and a password from the first user via the device control application browser, and sends the user ID and the password to the server 100 via the communication interface 360. The processor 110 of the server 100 accesses the database 101 or the group server 100B via the communication interface 160, and authenticates the user ID and the password. When the authentication of the user ID and the password by the server 100 is successful, the processor 310 of the terminal 300 accepts an instruction for starting a communication setting for a new device to be controlled, via the touch panel 350, as shown in FIG. 9.

The processor 310 of the terminal 300 then searches for a device 200 that is available for wireless communications such as by WiFi® and Bluetooth®, using the communication interface 360 (step S506). By using the information from the device 200 that is available for communications, the processor 310 of the terminal 300 displays selectable information, such as the type or the name of the device 200, on the touch panel 350, as shown in FIG. 10. The terminal 310 of the terminal 300 then accepts entry of information concerning the device 200 via the touch panel 350, as shown in FIG. 11.

The processor 310 of the terminal 300 makes a pairing request for the device 200 by sending the information from the device 200 and the information from the user to the server 100 via the communication interface 360 (step S508). For example, the processor 310 of the terminal 300 receives the identification information of the device 200 from the device 200 via the communication interface 360 through wireless communications. The processor 310 then sends the identification information and the user ID to the server 100 via the communication interface 360.

As shown in FIG. 12, the processor 310 of the first terminal 300 displays the pairing procedures for the device 200 and the first terminal 300 in the touch panel 350. At the press of a pairing button by the user, the device 200 sends the identification information to the server 100.

The server 100, upon checking that the identification information received from the first terminal 300 matches the identification signal received from the device 200, notifies the first terminal 300 of the completion of the pairing (step S512). The user can then remote control the device 200 via the server 100 through the first terminal 300.

At the completion of the pairing, the processor 310 of the terminal 300 displays information in the touch panel 350 that the device 200 has become controllable, as shown in FIG. 13. In the present embodiment, the information displayed in the touch panel 350 by the processor 310 of terminal 300 includes texts and images concerning the device 200, and icons that indicate that instructions are sendable to the device 200.

The present embodiment also enables a second user to safely and easily remote control the device 200, or view information of the device 200, in the manner described below.

The first user invites the second user to the group (step S516). Specifically, the first user opens a device control application in the first terminal 300, and enters an invitation instruction for the second user in the device control application. On the device control application, the processor 310 of the first terminal 300 sends the identification information to the second terminal 300 via the communication interface 160 to make the device 200 controllable by the second terminal 300.

Specifically, the processor 310 of the first terminal 300 directly sends the second terminal an invitation notification with the identification information through NFC (near field communications) such as Bluetooth® and FeliCa® via the communication interface 160, without using the group server 100B. Upon receiving the invitation notification, the processor 310 of the second terminal 300 opens a device control application, and indicates in the touch panel 350 that the device 200 has become controllable. In response to a user instruction, the processor 310 of the second terminal 300 can subsequently send a second request to the device 200 via the communication interface 160 by using the identification information contained in the invitation notification.

With the invitation, the second terminal 300 can access the device 200 via the server 100 (step S530). For example, the processor 310 of the second terminal 300 in response to a user instruction may (1) pair itself with the device 200 when the second user or the second terminals is determined as belonging to the same group as the first user with the identification information received from the first terminal 300, (2) send a control instruction to the device 200 by using the identification information received from the first terminal 300, (3) obtain operation information or state information from the device 200 by using the identification information received from the first terminal 300, or (4) access the device 200 by using the identification information received from the first terminal 300.

Sixth Embodiment

In the network systems according to First to Fifth Embodiments, the server 100 extracts devices 200 belonging to the same group as a second user attempting to access a device 200, and selectably presents these devices 200 to the second user. In the present embodiment, however, the second user first selects the device 200 that the second user wishes to access, and the server 100 determines whether to allow a request for the device 200 selected by the user.

Figure 34:
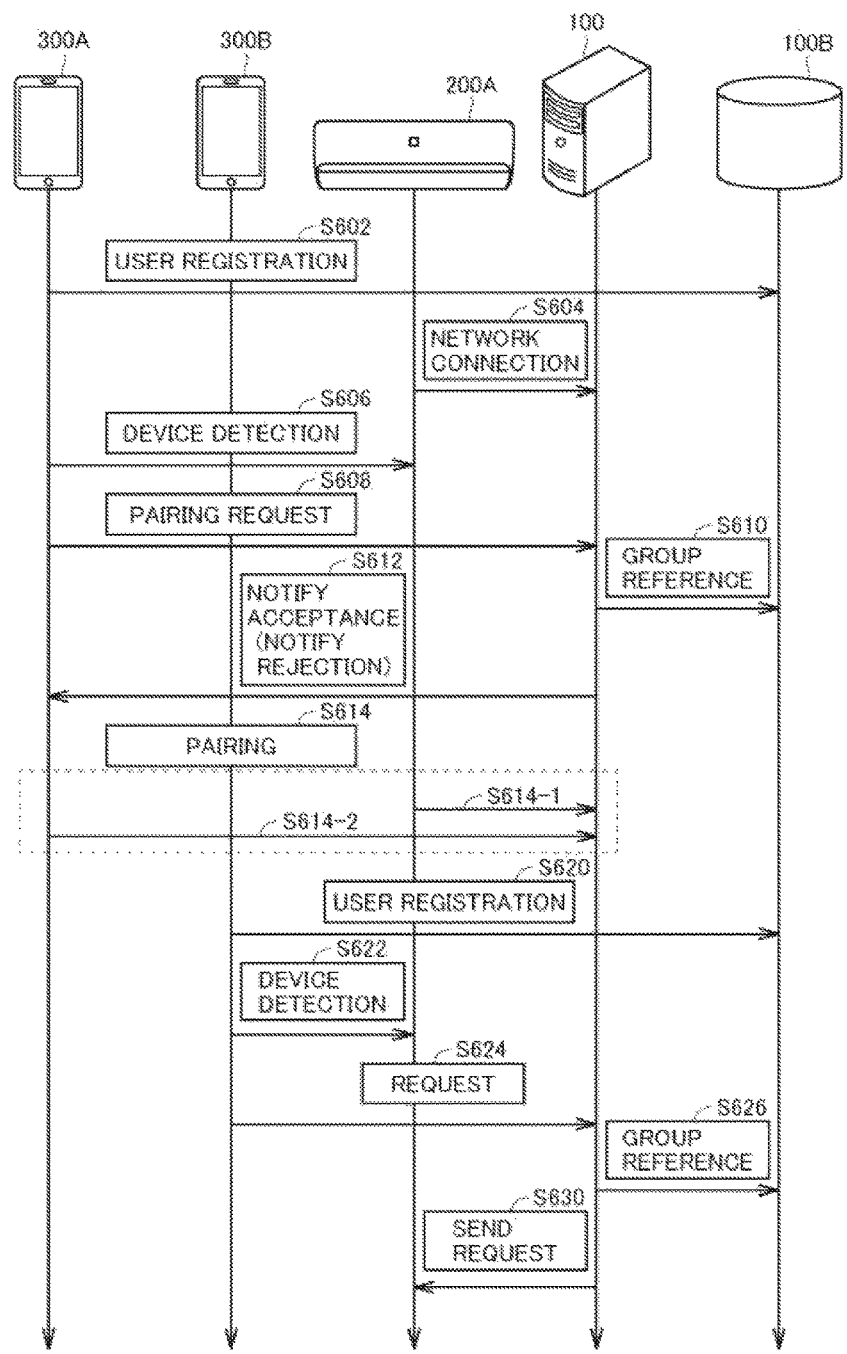
FIG. 34 is a sequence diagram representing the information process in the network system 1 according to Sixth Embodiment.

The following descriptions deal with the information process of the network system 1 according to the present embodiment, and the network system 1 will not be described with regard to the overall configuration and the hardware configuration of each component because these are the same as in First Embodiment. FIG. 34 is a sequence diagram representing the information process by the network system 1 according to the present embodiment.

Referring to FIG. 34, the processes from steps S602 to S614, specifically the processes for pairing the first user with the device 200 through the first terminal 300 are not described because these are the same as in steps S102 to S114 in FIG. 7 of First Embodiment.

The present embodiment also enables a second user to safely and easily remote control the device 200, or view information of the device 200, in the manner described below.

First, a second user with the second terminal 300 makes user registration in the group server 100B having access to the database 101 (step S620). The server 100 resisters the user ID in the user database 101A by associating the user ID with the group ID associated with the first user. The second user registers a user ID and a password in the group server 100B, or obtain a user ID and a password from the group server 100B.

The second user then activates a device control application in the second terminal 300. The terminal 300 accepts the user ID and the password from the second user through the browser of the device control application, and sends the user ID and the password to the server 100. The processor 110 of the server 100 accesses the database 101 or the group server 100B via the communication interface 160, and authenticates the user ID and the password.

When the authentication is successful, the processor 310 of the second terminal 300 obtains the MAC addresses or other such identification information of devices 200 via the communication interface 360 through wireless communications (step S622). From the devices 200 in wireless communications, the second user selects the device 200 that he or she wishes to control or obtain information from. Alternatively, the second user enters in the second terminal 300 the MAC address or other such identification information of the device 200 that he or she wishes to control or obtain information from (step S622).

The processor 310 through the touch panel 350 accepts a user request for the device 200. The processor 310 via the communication interface 360 sends the request to the server 100 with the MAC address or other such identification information (step S624).

By using the previously received user ID, and the device ID associated with the currently received MAC address or identification information, the processor 110 of the server 100 refers to the database 101 via the communication interface 160, and determines whether the user of the second terminal 300 belongs to the same group as the device 200 (step S626).

If the user of the second terminal 300 belongs to the same group as the device 200, the processor 110 via the communication interface 160 sends the request from the second terminal 300 to the device 200 (step S630). On the other hand, if the user of the second terminal 300 does not belong to the same group as the device 200, the processor 110 sends a message to the second terminal 300 via the communication interface 160 that the request from the second terminal 300 is unacceptable.

Seventh Embodiment

In the network systems according to First to Sixth Embodiments, the server 100 determines whether to accept a request from the second user on the basis of the result of the determination whether the second user and the device belong to the same group. However, whether to accept a request from the second terminal may be determined not by the user ID but by the result of the determination whether the second terminal and the device belong to the same group.

Specifically, the present embodiment, unlike First to Sixth Embodiments, requires a terminal database that associates terminals and groups, instead of the user database 101A that associates users and groups. FIG. 35 is a schematic diagram representing the data structure of a terminal database 101C according to the present embodiment. Referring to FIG. 35, the terminal database 101C stores the associations between terminal IDs and group IDs.

In the present embodiment, the first user via the first terminal 300 makes terminal registration in the group server 100B having access to the database 101. This is performed in, for example, step S102 of FIG. 7, step S202 of FIG. 30, step S302 of FIG. 31, step S402 of FIG. 32, and step S602 of FIG. 34. For example, the first user registers a user ID, a terminal ID, and a password in the group server 100B, or obtain a user ID, a terminal ID, and a password from the group server 100B. In the present embodiment, the group server 100B operates the service. However, this function may be served by the device control service server 100 instead.

The server 100 refers to the database 101, and determines whether to accept a request from the second user by using the result of the determination whether the terminal of the second user belongs to the same group as the device. This is performed in, for example, steps S122 to S128 of FIG. 7, steps S222 to S228 of FIG. 30, steps S322 to S328 of FIG. 31, steps S422 to S428 of FIG. 32, and steps S622 to S630 of FIG. 34.

The following process is performed in step S626 of FIG. 7 when the second user selects the accessing device 200, and the server 100 determines whether to allow the request for the user selected device 200 in the manner described in Sixth Embodiment.

Specifically, by using the terminal ID received from the second terminal 300, and the device ID associated with the designated MAC address or identification information, the processor 110 of the server 100 refers to the database 101 via the communication interface 160, and determines whether the terminal 300 and the device 200 belong to the same group.

Figure 36:
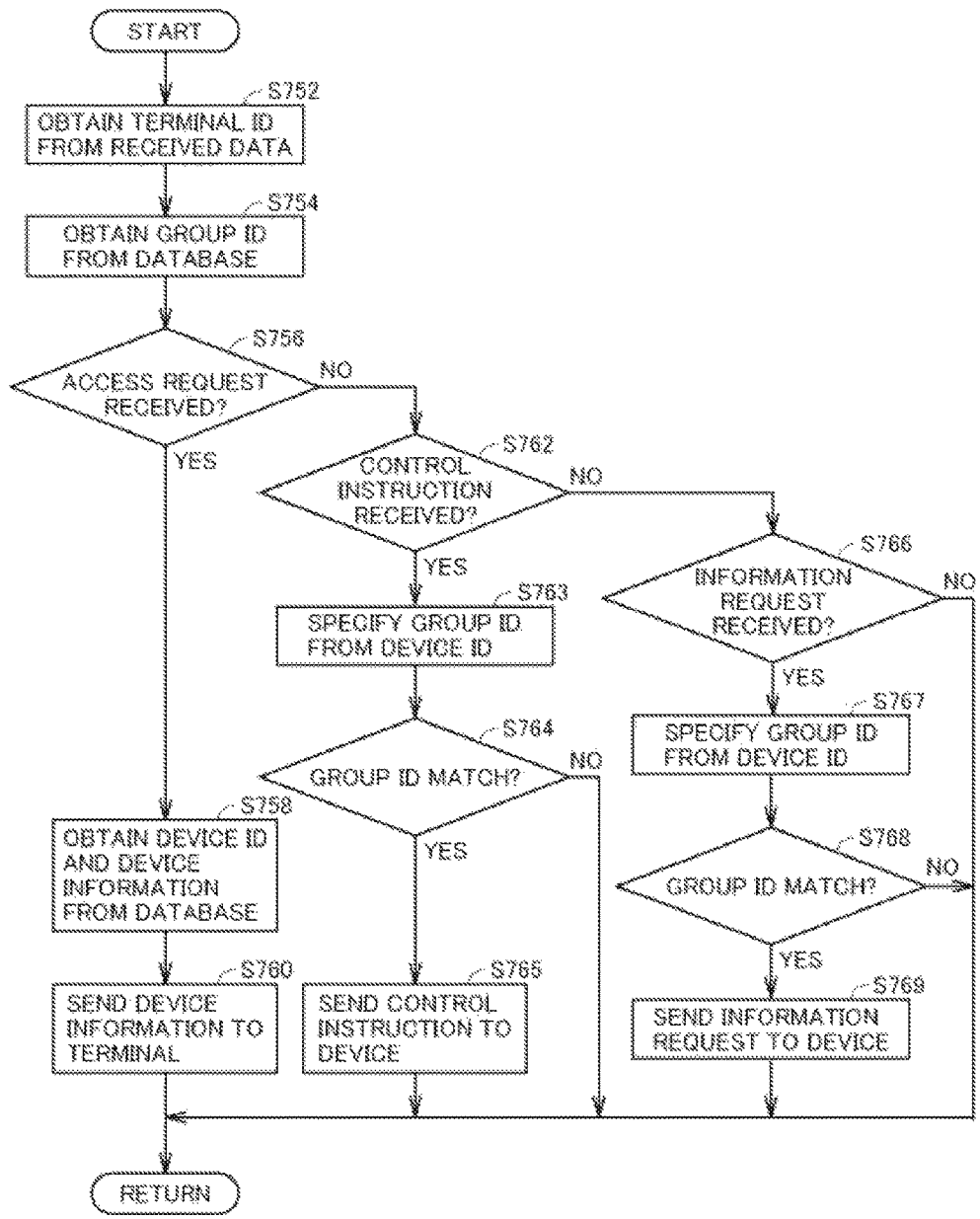
FIG. 36 is a flowchart representing the information process by a server 100 according to Seventh Embodiment.

The information process by the server 100 according to the present embodiment is described below with reference to FIG. 36. FIG. 36 is a flowchart representing the information process by the server 100 according to the present embodiment. The processes in step S756 and steps S762 to S769 are the same as step S156 and steps S162 to S169 of FIG. 15, and will not be described.

Specifically, the processor 110 of the server 100 obtains a terminal ID from the received data (step S752). The processor 110 refers to the terminal database 101C, and specifies the group ID that is associated with the terminal ID (step S754). The processor 110 also refers to the device database 101B, and specifies the device ID that is associated with the group ID (step S758). The processor 110 via the communication interface 160 then sends the terminal the device information associated with the device ID (step S760).

The overall configuration, and the hardware configuration of each component of the network system 1 are not described because these are the same as in First Embodiment.

The present embodiment uses terminal IDs to identify terminals. However, instead of the terminal IDs, it is also possible to use application IDs that identify the device control applications installed in the terminals.

Eighth Embodiment

In the network systems according to First to Sixth Embodiments, the server 100 determines whether to accept a request from the second user on the basis of the result of the determination whether the second user and the device belong to the same group. However, whether to accept a request from the second user may be determined on the basis of the result of the determination whether the second user belongs to the same group as the first user that has been paired with the device.

Specifically, the present embodiment, unlike First to Sixth Embodiments, requires a pairing user database that associates devices and pairing users, instead of the device database 101B that associates devices and groups. FIG. 37 is a schematic diagram representing the data structure of a pairing user database 101D according to the present embodiment. Referring to FIG. 37, the pairing user database 101D stores the associations between device IDs, pairing user IDs, MAC addresses, and other such device information.

The server 100 refers to the database 101, and determines whether to accept a request from the second user on the basis of the result of the determination whether the second user belongs to the same group as the first user that has been paired with the device. This is performed in, for example, steps S122 to S128 of FIG. 7, steps S222 to S228 of FIG. 30, steps S322 to S328 of FIG. 31, steps S422 to S428 of FIG. 32, and steps S622 to S630 of FIG. 34.

The following process is performed in step S626 of FIG. 7 when the second user selects the accessing device 200, and the server 100 determines whether to allow the request for the user selected device 200 in the manner described in Sixth Embodiment.

Specifically, by using the user ID received from the second terminal 300, and the device ID associated with the designated MAC address or identification information, the processor 110 of the server 100 refers to the database 101 via the communication interface 160, and determines whether the user ID of the user that has been paired with the device 200 associated with the device ID belongs to the same group as the currently received user ID.

Figure 38:
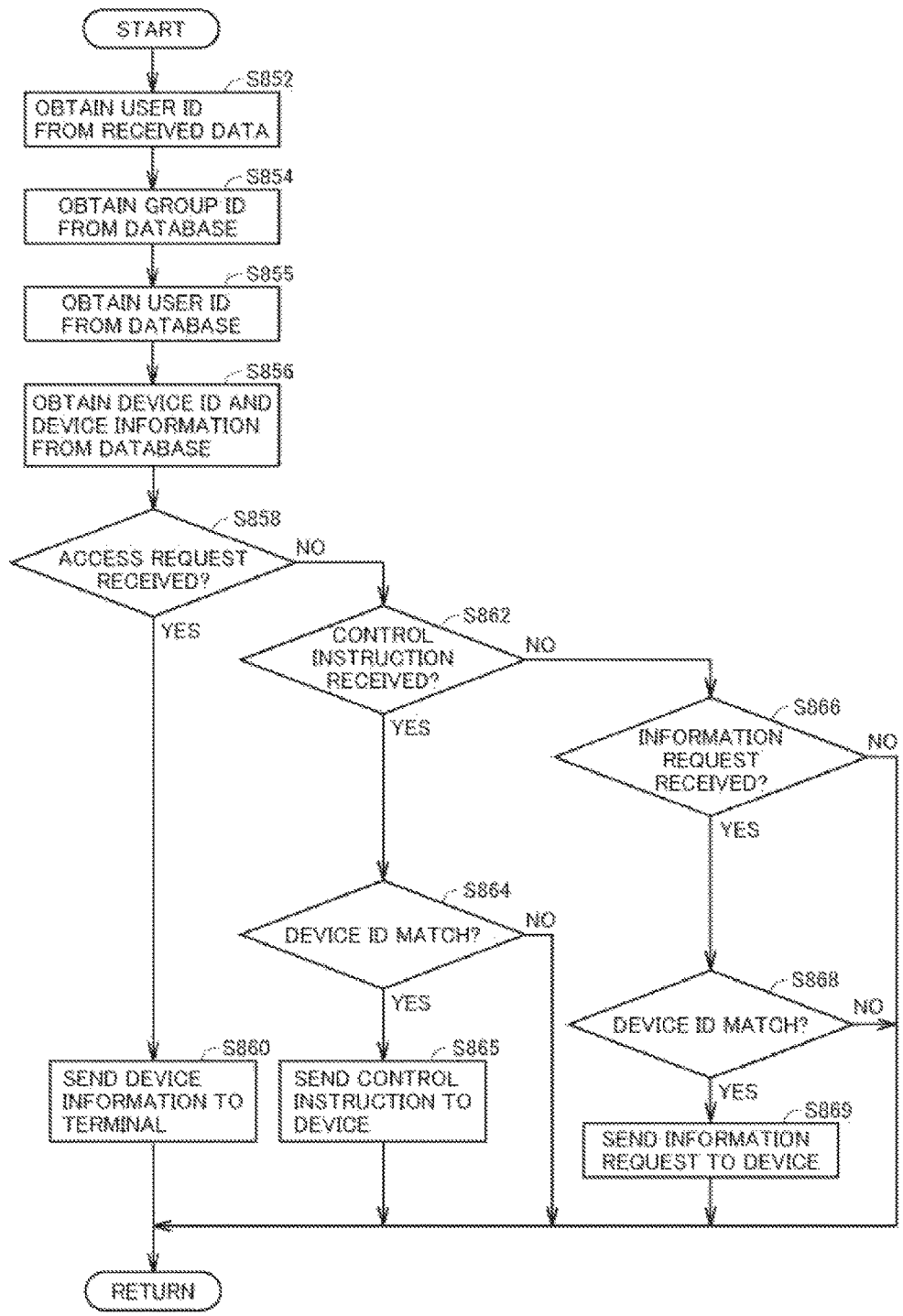
FIG. 38 is a flowchart representing the information process by a server 100 according to Eighth Embodiment.

The information process by the server 100 according to the present embodiment is described below with reference to FIG. 38. FIG. 38 is a flowchart representing the information process by the server 100 according to the present embodiment.

The processor 110 of the server 100 obtains a user ID from the received data (step S852). The processor 110 then refers to the user database 101A, and specifies the group ID that is associated with the user ID (step S854). The processor 110 also refers to the user database 101A, and specifies all the user IDs associated with the group ID (step S855). The processor 110 then refers to the pairing user database 101D, and specifies the device ID that is associated with the all user IDs specified in step S855 (step S856).

The processor 110 determines whether the received data from the terminal 300 contains an access request (step S858). If the received data contains an access request (YES in step S858), the processor 110 via the communication interface 160 sends the terminal the device information associated with the device ID (step S860). The processor 110 then waits for data from another terminal via the communication interface 160.

If the received data does not contain an access request (NO in step S858), the processor 110 determines whether the received data contains a control instruction for the device 200 (step S862). If the received data contains a control instruction for the device 200 (YES in step S862), the processor 110 determines whether the device ID contained in the control instruction matches the device ID obtained in step S856 (step S864). If the device ID matches the device ID obtained in step S856 (YES in step S864), the processor 110 via the communication interface 160 sends the control instruction to the device 200 (step S865). The processor 110 then waits for data from another terminal 300 via the communication interface 160.

If the received data does not contain a control instruction for the device 200 (NO in step S862), the processor 110 determines whether the received data contains an information request (step S866). If the received data contains an information request (YES in step S866), the processor 110 determines whether the device ID contained in the control instruction matches the device ID obtained in step S856 (step S868). If the device ID matches the device ID obtained in step S856 (YES in step S868), the processor 110 via the communication interface 160 requests the device 200 to send information (step S869). The processor 110 then sends the information from the device 200 to the terminal 300 via the communication interface 160 (not shown in the figure). The processor 110 then waits for any incoming data from the terminal 300 via the communication interface 160.

In this way, a change in the group information of the user or the device can be reflected in making the decision to enable steps S865 and S869 in the services provided by the group server 100B and the server 100.

If the received data does not contain an information request (NO in step S866), the processor 110 waits for any incoming data from the terminal 300 via the communication interface 160.

The overall configuration, and the hardware configuration of each component of the network system 1 are not described because these are the same as in First Embodiment.

Ninth Embodiment

In the network systems according to First to Sixth Embodiments, the server 100 determines whether to accept a request from the second user on the basis of the result of the determination whether the second user and the device belong to the same group. However, whether to accept a request from the second terminal may be determined on the basis of the result of the determination whether the second terminal belong to the same group as the first terminal that has been paired with the device.

Specifically, the present embodiment, unlike First to Sixth Embodiments, requires both a terminal database 101C (see Seventh Embodiment) that associates terminals and groups, instead of the user database 101A that associates users and groups, and a pairing terminal database that associates devices and pairing terminals, instead of the device database 101B that associates devices and groups. FIG. 39 is a schematic diagram representing the data structure of a pairing terminal database 101E according to the present embodiment. Referring to FIG. 39, the pairing terminal database 101E stores the associations between device IDs, pairing terminal IDs, MAC addresses, and other such device information.

The server 100 refers to the database 101, and determines whether to accept a request from the second terminal on the basis of the result of the determination whether the second terminal belongs to the same group as the first terminal that has been paired with the device. This is performed in, for example, steps S122 to S128 of FIG. 7, steps S222 to S228 of FIG. 30, steps S322 to S328 of FIG. 31, steps S422 to S428 of FIG. 32, and steps S622 to S630 of FIG. 34.

The following process is performed in step S626 of FIG. 7 when the second user selects the accessing device 200, and the server 100 determines whether to allow the request for the user selected device 200 in the manner described in Sixth Embodiment.

Specifically, by using the terminal ID received from the second terminal 300, and the device ID associated with the designated MAC address or identification information, the processor 110 of the server 100 refers to the database 101 via the communication interface 160, and determines whether the terminal ID of the terminal that has been paired with the device 200 associated with the device ID belongs to the same group as the currently received terminal ID.

The information process by the server 100 according to the present embodiment is described below with reference to FIG. 40. FIG. 40 is a flowchart representing the information process by the server 100 according to the present embodiment. The processes in step S958 and steps S962 to S969 are the same as in step S858 and steps S862 to S869 of FIG. 38, and will not be described.

The processor 110 of the server 100 obtains a terminal ID from the received data (step S952). The processor 110 then refers to the terminal database 101C, and specifies the group ID that is associated with the terminal ID (step S954). The processor 110 also refers to the terminal database 101C, and specifies all the terminal IDs associated with the group ID (step S955). The processor 110 then refers to the pairing terminal database 101E, and specifies the device ID associated with the all terminal IDs specified in step S955 (step S958). The processor 110 via the communication interface 160 then sends the terminal the device information associated with the device ID (step S960).

The overall configuration, and the hardware configuration of each component of the network system 1 are not described because these are the same as in First Embodiment.

The present embodiment uses terminal IDs to identify terminals. However, instead of the terminal IDs, it is also possible to use application IDs that identify the device control applications installed in the terminals.

Examples of Other Applications

As is evident, the present invention also can be achieved by supplying a program to a system or a device. The advantages of the present invention also can be obtained with a computer (or a CPU or an MPU) in a system or a device upon the computer reading and executing the program code stored in the supplied storage medium (or memory) storing software programs intended to realize the present invention.

In this case, the program code itself read from the storage medium realizes the functions of the embodiments above, and the storage medium storing the program code constitutes the present invention.

Evidently, the functions of the embodiments above can be realized not only by a computer reading and executing such program code, but by some or all of the actual processes performed by the OS (operating system) or the like running on a computer under the instructions of the program code.

The functions of the embodiments above also can be realized by some or all of the actual processes performed by the CPU or the like of an expansion board or expansion unit under the instructions of the program code read from a storage medium and written into other storage medium provided in the expansion board inserted into a computer or the expansion unit connected to a computer.

The embodiments disclosed herein are to be considered in all aspects only as illustrative and not restrictive. The scope of the present invention is to be determined by the scope of the appended claims, not by the foregoing descriptions, and the invention is intended to cover all modifications falling within the equivalent meaning and scope of the scope of the claims set forth below.

What is claimed is:

1. A network system comprising:
    a plurality of terminals including at least a first terminal and a second terminal;
    one or more devices including at least a first device; and
    a server adapted to refer to at least one of group information of the plurality of terminals and group information of a plurality of users,
    wherein the server, upon receiving a request for the first device from the first terminal, refers to the group information, and accepts the request when the first device is controllable by the second terminal belonging to a group to which the first terminal belongs, or when the first device is controllable by a user belonging to a group to which a user of the first terminal belongs, and rejects the request when the first device is not controllable by any of the plurality of terminals belonging to a group to which the first terminal belongs, or when the first device is not controllable by any user belonging to a group to which a user of the first terminal belongs.

2. The network system according to claim 1, wherein the server or a different server sends the second terminal information for inviting the second terminal to a group to which a user of the first terminal belongs, the information being sent according to an instruction from the first terminal.

3. The network system according to claim 1, wherein a user of the first terminal belonging to a first group to which a user of the second terminal belongs is allowed to belong to a second group to which a user of a third terminal belongs.

4. An information processing method for a network system that includes: a plurality of terminals including at least a first terminal and a second terminal; one or more devices including at least a first device; and a server, that is adapted to refer to at least one of group information of the plurality of terminals and group information of a plurality of users,
    the method comprising:
    the server receiving a request for the first device from the first terminal; and
    the server referring to the group information, and accepting the request when the first device is controllable by the second terminal belonging to a group to which the first terminal belongs, or when the first device is controllable by a user belonging to a group to which a user of the first terminal belongs, and rejecting the request when the first device is not controllable by any of the plurality of terminals belonging to a group to which the first terminal belongs, or when the first device is not controllable by any user belonging to a group to which a user of the first terminal belongs.

5. A server comprising:
    a communication interface for communicating with a plurality of terminals including at least a first terminal and a second terminal, and one or more devices including at least a first device; and
    a processor,
    wherein the server is adapted to refer to at least one of group information of the plurality of terminals and group information of a plurality of users,
    wherein the processor receives a request for the first device from the first terminal via the communication interface, and
    wherein the processor refers to the group information, and accepts the request when the first device is controllable by the second terminal belonging to a group to which the first terminal belongs, or when the first device is controllable by a user belonging to a group to which a user of the first terminal belongs, and rejects the request when the first device is not controllable by any of the plurality of terminals belonging to a group to which the first terminal belongs, or when the first device is not controllable by any user belonging to a group to which a user of the first terminal belongs.

6. An information processing method for a server that includes: a communication interface for communicating with a plurality of terminals including at least a first terminal and a second terminal, and one or more devices including at least a first device; and a processor, and that is adapted to refer to at least one of group information of the plurality of terminals and group information of a plurality of users,
    the method comprising:
    the processor receiving a request for the first device from the first terminal via the communication interface; and
    the processor referring to the group information, and accepting the request when the first device is controllable by the second terminal belonging to a group to which the first terminal belongs, or when the first device is controllable by a user belonging to a group to which a user of the first terminal belongs, and rejecting the request when the first device is not controllable by any of the plurality of terminals belonging to a group to which the first terminal belongs, or when the first device is not controllable by any user belonging to a group to which a user of the first terminal belongs.

* * * * *